US011729619B2

United States Patent
Lee et al.

(10) Patent No.: US 11,729,619 B2
(45) Date of Patent: *Aug. 15, 2023

(54) METHODS AND APPARATUS FOR WIRELESS COMMUNICATION USING A SECURITY MODEL TO SUPPORT MULTIPLE CONNECTIVITY AND SERVICE CONTEXTS

(71) Applicant: QUALCOMM Incorporated, San Diego, CA (US)

(72) Inventors: Soo Bum Lee, San Diego, CA (US); Stefano Faccin, San Ysidro, CA (US); Gavin Bernard Horn, La Jolla, CA (US); John Nasielski, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,513

(22) Filed: Jan. 3, 2022

(65) Prior Publication Data

US 2022/0132313 A1   Apr. 28, 2022

Related U.S. Application Data

(63) Continuation of application No. 15/048,044, filed on Feb. 19, 2016, now Pat. No. 11,234,126.
(Continued)

(51) Int. Cl.
*H04L 9/40*   (2022.01)
*H04W 12/08*   (2021.01)
(Continued)

(52) U.S. Cl.
CPC ......... *H04W 12/08* (2013.01); *H04L 63/0428* (2013.01); *H04W 12/06* (2013.01);
(Continued)

(58) Field of Classification Search
CPC ..... H04W 12/08; H04W 12/06; H04W 76/10; H04W 76/15; H04W 12/71; H04W 12/72; H04W 80/02; H04L 63/0428
See application file for complete search history.

(56) References Cited

U.S. PATENT DOCUMENTS

| 2007/0258427 A1 | 11/2007 | Shaheen et al. |
| 2009/0238143 A1 | 9/2009 | Mukherjee et al. |

(Continued)

FOREIGN PATENT DOCUMENTS

| CN | 101026861 A | 8/2007 |
| CN | 101242629 A | 8/2008 |

(Continued)

OTHER PUBLICATIONS

International Preliminary Report on Patentability—PCT/US2016/059494, The International Bureau of WIPO—Geneva, Switzerland, dated May 31, 2018.
(Continued)

*Primary Examiner* — Amie C. Lin
(74) *Attorney, Agent, or Firm* — Loza & Loza, LLP

(57) ABSTRACT

Aspects of the present disclosure provide for a security model for enabling multiple connectivity and service contexts while sharing a single connectivity context to establish a network connection. A context (e.g., connectivity context, service context, security context) is a set of information describing the connectivity, service, or security established between two or more entities. The connectivity context and service context may be established at different network nodes or entities. In one aspect of the disclosure, a connec-
(Continued)

tivity context includes an Evolved Packet System (EPS) Mobility Management (EMM) context or both an EMM context and an EPS Session Management (ESM) context.

14 Claims, 23 Drawing Sheets

Related U.S. Application Data

(60) Provisional application No. 62/256,472, filed on Nov. 17, 2015.

(51) Int. Cl.
*H04W 76/10* (2018.01)
*H04W 12/06* (2021.01)
*H04W 76/15* (2018.01)
*H04W 80/02* (2009.01)
*H04W 12/71* (2021.01)
*H04W 12/72* (2021.01)

(52) U.S. Cl.
CPC ........... *H04W 76/10* (2018.02); *H04W 76/15* (2018.02); *H04W 12/71* (2021.01); *H04W 12/72* (2021.01); *H04W 80/02* (2013.01)

(56) References Cited

U.S. PATENT DOCUMENTS

| | | | | |
|---|---|---|---|---|
| 2010/0325267 | A1* | 12/2010 | Mishra | H04L 41/0823 709/224 |
| 2012/0033565 | A1 | 2/2012 | Suh et al. | |
| 2012/0281566 | A1 | 11/2012 | Pelletier et al. | |
| 2013/0080782 | A1* | 3/2013 | Rajadurai | H04W 12/06 713/171 |
| 2014/0064209 | A1* | 3/2014 | Anchan | H04W 76/25 370/329 |
| 2014/0119353 | A1 | 5/2014 | McCann et al. | |
| 2014/0334297 | A1 | 11/2014 | Ahmavaara | |
| 2015/0229620 | A1 | 8/2015 | Zhang et al. | |
| 2015/0282042 | A1 | 10/2015 | Griot et al. | |
| 2016/0007193 | A1* | 1/2016 | Zhang | H04W 12/033 380/279 |
| 2016/0044567 | A1* | 2/2016 | Baghel | H04W 4/24 370/331 |
| 2017/0142587 | A1 | 5/2017 | Lee et al. | |
| 2019/0014464 | A1* | 1/2019 | Kuge | H04W 28/06 |

FOREIGN PATENT DOCUMENTS

| | | | | |
|---|---|---|---|---|
| CN | 101610504 | A | 12/2009 | |
| CN | 104704790 | A | 6/2015 | |
| EP | 2309808 | A2 | 4/2011 | |
| JP | 2010537457 | A | 12/2010 | |
| KR | 20130080804 | A | 7/2013 | |
| TW | 201507400 | A | 2/2015 | |
| WO | 2009038522 | A1 | 3/2009 | |
| WO | 2011043772 | A1 | 4/2011 | |
| WO | WO-2011043772 | A1 * | 4/2011 | ........... H04L 63/105 |
| WO | 2011152665 | A2 | 12/2011 | |
| WO | 2014165832 | A1 | 10/2014 | |

OTHER PUBLICATIONS

International Search Report and Written Opinion—PCT/US2016/059494—ISA/EPO—dated Jan. 16, 2017.
Taiwan Search Report—TW105134715—TIPO—dated Mar. 10, 2020.

* cited by examiner

METHODS AND APPARATUS FOR WIRELESS COMMUNICATION USING A SECURITY MODEL TO SUPPORT MULTIPLE CONNECTIVITY AND SERVICE CONTEXTS

PRIORITY CLAIM

This application is a Continuation of non-provisional patent application Ser. No. 15/048,044, filed in the United States Patent and Trademark Office on Feb. 19, 2016, which claims priority to and the benefit of provisional patent application No. 62/256,472, filed in the United States Patent and Trademark Office on Nov. 17, 2015, the entire content of which is incorporated herein by reference.

TECHNICAL FIELD

The technology discussed below relates generally to wireless communication systems, and more particularly, to a security model for supporting multiple connectivity and service contexts.

BACKGROUND

Current wireless systems typically operate in the packet switched domain. Some examples of wireless systems are LTE (Long Term Evolution), LTE-A (LTE-Advance), and WLAN (wireless local access networks). Such wireless systems typically support only a single subscription and/or single credential by using a single connectivity context between a user device and a connectivity management portion of a network. In an LTE example, a single non-access stratum (NAS) context may be used between a user equipment (UE) (user device) and a mobility management entity (MME). In LTE, the NAS is a set of protocols used to convey non-radio related signaling between the UE and the MME for an LTE access. A connectivity context generally refers to the information associated with or defining a connection between two entities (e.g., user device-to-network entity or network-to-entity-network entity).

In the related art, a user device (e.g., mobile device or UE) generally includes a subscriber identity module (SIM) card that includes identification information and a key unique to that SIM card. A user device making use of a subscription to a service provided by a network operator is able to establish a radio link or connectivity with the network by virtue of the identification and key (or authentication) information stored on the SIM card. In other words, there is a tight connection (e.g., a one-to-one relationship) between the use of an access link and a connectivity context. Examples of access links include user plane and Radio Resource Control (RRC) or Media Access Control (MAC) signaling connections in case of cellular network. In an LTE example, establishing a radio link involves an EMM (Evolved Packet System (EPS) Mobility Management) context and an ESM (EPS Session Management) context. Furthermore, when a UE connects to a network, in the LTE example, a mobility management context (EMM context) and a session management context (ESM context) are created at a mobility management entity (MME). Both the EMM context and ESM context are associated with a single credential stored in the SIM card (e.g., SIM credential). The credential allows the MME to determine whether or not the UE can be authenticated to establish the requested connectivity. In this case, the MME provides one point of authentication with one provider for all available services. There is a one-to-one association between the pair of contexts and the SIM credential. Accordingly, it may be said that the pair of related contexts is tightly coupled to the SIM credential.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure disclose a security model for supporting multiple connectivity and service contexts. Different credentials can be used to establish a connectivity context and multiple service contexts.

One aspect of the disclosure provides a method of operating a client device in a wireless communication network. According to the method, a client device establishes a connection with a connectivity network based on a first credential. The client device establishes a connectivity context corresponding to the connection. The client device identifies one or more service networks associated with the connectivity network. The client device establishes one or more service connections with the one or more service networks utilizing the established connection, wherein the one or more service connections are established using respective second credentials. The client device establishes one or more service contexts respectively corresponding to the service connections. The one or more service contexts respectively include different security contexts. Each of the security contexts includes a non-access stratum (NAS) security context and an access stratum (AS) security context, both corresponding to the same second credential.

One aspect of the disclosure provides a method of operating a network node of a connectivity network. According to the method, the network node establishes a first connection with a client device based on a connectivity credential. The network node establishes a connectivity context corresponding to the first connection. The network node receives a request, from the client device, to establish connection with one or more service networks. The network node establishes a plurality of second connections with the service networks respectively for the client device, utilizing the network node as a proxy. The network node includes a host mobility management entity (HMME).

One aspect of the disclosure provides a method of operating a network node of a service network. According to the method, the network node receives a request, from a client device, to establish a connection. The network node establishes the connection with the client device via a network node of a connectivity network. The network node of the connectivity network includes a host mobility management entity (HMME). The network node establishes a service context corresponding to the connection, wherein the service context is associated with a security context.

One aspect of the disclosure provides a client device in a wireless communication network. The client device includes a memory stored with computer executable code, a communication interface configured to communicate with a connectivity network, and a processor operatively coupled to the memory and the communication interface. The processor is configured by the computer executable code to establish a connection with a connectivity network based on a first credential. The processor is further configured to establish a connectivity context corresponding to the connection. The processor is further configured to identify one or more service networks associated with the connectivity network. The processor is further configured to establish one or more service connections with the one or more service networks utilizing the established connection. The one or more service connections are established using respective second credentials. The processor is further configured to establish one or more service contexts respectively corresponding to the service connections. The one or more service contexts respectively include different security contexts. Each of the security contexts includes a non-access stratum (NAS) security context and an access stratum (AS) security context, both corresponding to the same second credential.

One aspect of the disclosure provides a network node of a connectivity network. The network node includes a memory stored with computer executable code, a communication interface configured to communicate with a client device, and a processor operatively coupled to the memory and the communication interface. The processor is configured by the computer executable code to establish a first connection with the client device based on a connectivity credential. The processor is further configured to establish a connectivity context corresponding to the first connection. The processor is further configured to receive a request, from the client device, to establish service connection with one or more service networks. The processor is further configured to establish a plurality of second connections with the service networks respectively for the client device, utilizing the network node as a proxy. The network node includes a host mobility management entity (HMME).

One aspect of the disclosure provides a network node of a service network. The network node includes a memory stored with computer executable code, a communication interface configured to communicate with a client device, and a processor operatively coupled to the memory and the communication interface. The processor is configured by the executable code to receive a request, from the client device, to establish a connection. The processor is further configured to establish the connection with the client device via a network node of a connectivity network. The network node of the connectivity network includes a host mobility management entity (HMME). The processor is further configured to establish a service context corresponding to the connection, wherein the service context is associated with a security context.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
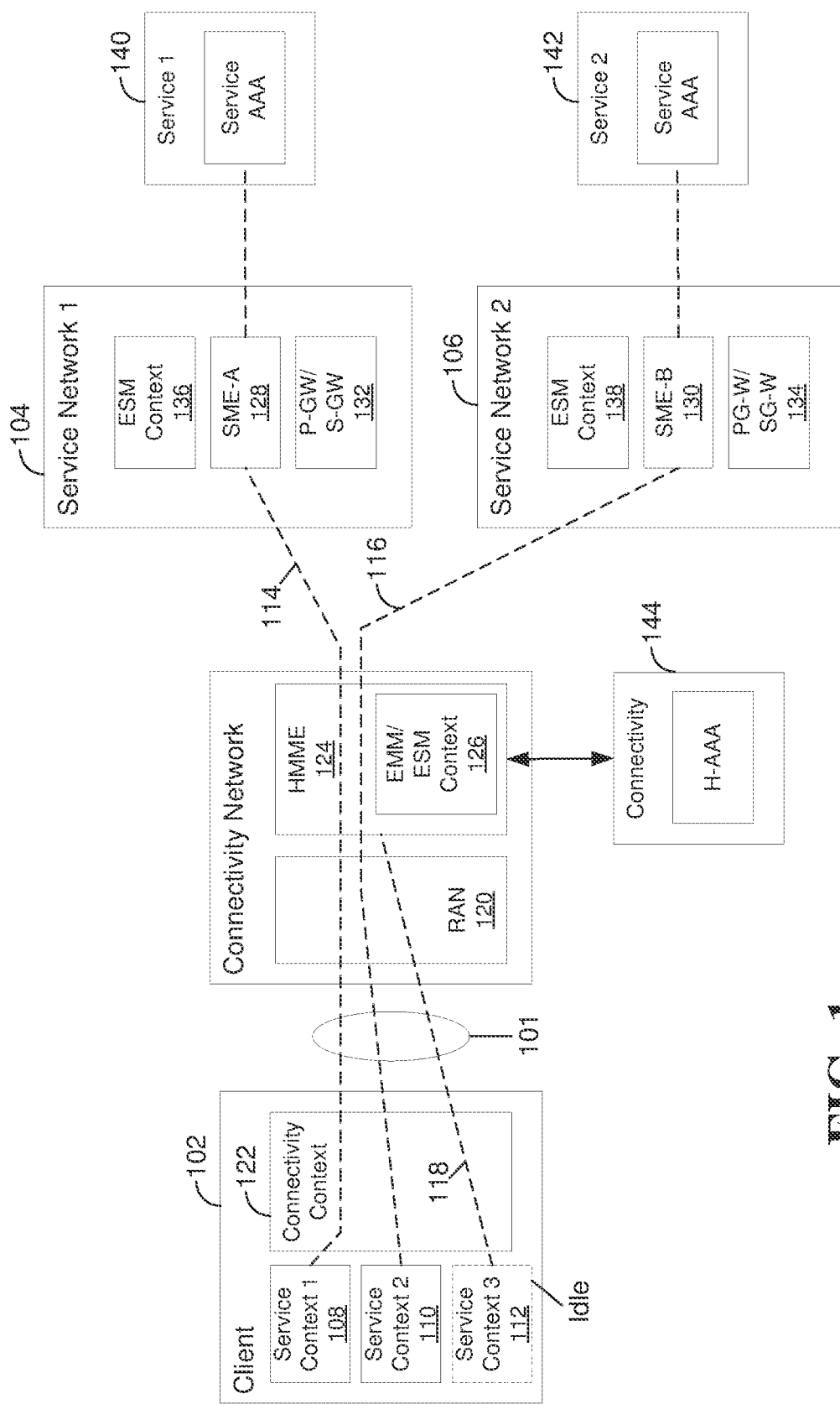
FIG. 1 is a diagram illustrating a single radio link between a client device and a radio assess network (RAN) that supports multiple service connections associated with different service contexts, in accordance with an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure provide for a security model for enabling multiple connectivity and service contexts while sharing a single connectivity context to establish a network connection. The network connection may include a single radio or wireless link, which may support multiple service connections that use multiple distinct service contexts and security contexts. A single radio or wireless link may include one or more wireless channels, frequencies or carriers corresponding to a single connectivity context. In general, a context (e.g., connectivity context, service context, security context) is a set of information describing the connectivity, service, or security established between two or more entities. In one aspect of the disclosure, a connectivity context includes an Evolved Packet System (EPS) Mobility Management (EMM) context or both an EMM context and an EPS Session Management (ESM) context.

In one aspect of the disclosure, a radio resource control (RRC) link or a media access control (MAC) link may be established between a client device (e.g., UE) and a radio access network (RAN) based on a single connectivity context (e.g., EMM context). In one example, the RAN may be a cellular RAN or a radio network composed of Wi-Fi access points, or a combination of cellular and Wi-Fi radio. In another example, the RAN may have one or more radio access nodes operating in licensed and/or unlicensed spectrum and controlled by a common radio resource control (RRC) or media access control (MAC) mechanism. In various examples, an RRC may include cellular RRC, cellular RRM (radio resource management), media access control (MAC), or any other signaling mechanism to control access to radio resources over one or more links, including the establishment of radio resources for transport of higher layer signaling and user data.

After the single connectivity context (e.g., EMM context) is established, the client device may use multiple different service contexts protected by different security contexts to establish simultaneous or concurrent service connections over the single link. In one example, a service context includes an ESM context. In this manner, a shared single connectivity context is used for lower level radio link connectivity while two or more service contexts are used to establish service connections over the radio link, for example, with service providers. Aspects of the disclosure provide a security model for protecting the service connections while sharing a single link or connection to the RAN.

Single Connectivity Connection Supporting Multiple Service Connections

FIG. 1 illustrates a single radio link 101 between a client device 102 (e.g., UE) and a radio access network (RAN) 120, which may serve to couple the client device 102 to two or more service providers 104 or provisioning functionalities 104 and 106 while supporting multiple service connections 114, 116, 118 associated with different service contexts 108, 110, and 112. In this particular example, a single connectivity context 122, implemented at the client device 102, may be utilized to establish a radio link 101 with the RAN 120. The radio link 101 may be shared by multiple simultaneous connections associated with different service contexts 108, 110, and 112. The single connectivity context (e.g., EMM context or EMM/ESM context) is used to establish connection with a network host mobility management entity 124 (HMME) that provides: security, signaling for bearer management and data connection management, paging, mobility, etc. The use of the single connectivity context 122 facilitates the use of the multiple simultaneous or concurrent service contexts 108, 110, 112, having corresponding service connections 114, 116, and 118, over the same radio link 101. Each of the service connections may be protected with different security contexts (e.g., shown in FIGS. 4-6, and 14-18). In one example, if the client device 102 has three types of subscriptions (e.g., three service contexts), this may enable an ability to establish three simultaneous service connections 114, 116, and 118: one for each subscription and/or service context 108, 110, and 112, over the single (same) radio link 101 between the client device 102 and the RAN 120. The single radio link may include one or more radio bearers. Any one or more of the simultaneous service connections 114, 116, and/or 118 may be idle or active at any given time.

A host MME 124 (HMME) may be implemented logically close to the RAN 120 and serves to manage the establishment of the connectivity contexts (e.g. an EMM context or an EMM/ESM context) and to establish the radio link 101 based on the shared connectivity context 122. The host MME 124 may serve to authenticate a client device 102 to establish a connectivity context. For example, the host MME 124 may perform non-access stratum (NAS) EPS Mobility Management (EMM) over a control plane with the client device 102 to control mobility and/or security for the client device 102. The host MME 124 may also perform non-access stratum (NAS) EPS Session Management (ESM) over a control plane with the client device 102 to support or configure the service connections 114, 116, 118. The host MME 124 may authenticate the client device 102 with a home authorization, authentication, and accounting (H-AAA) server 144 to ascertain whether the connectivity context 122 should be established, based on credentials and subscription information associated with the client device 102. For example, the client device 102 may have a SIM card for storing the credentials and subscription information. Consequently, the connectivity context 122 serves to establish a single radio link 101 that can be shared by multiple service connections 114, 116, and 118 of the client device 102.

NAS Security

In one aspect of the disclosure, a non-access stratum (NAS) model is modified to enable separate EMM and ESM contexts. For example, an EMM context with a HMME can be established without an ESM context. The HMME is a core network entity that may be located close to a RAN. A client (e.g., UE) may have different credentials for establishing different contexts. For example, credentials used to establish an EMM context may be different from credentials used for establishing an ESM context. Credentials may be information, which may be stored at a client and/or a network node, for determining whether or not the client can establish the requested EMM context and/or ESM context (s). For example, a connectivity credential is used to establish an EMM context while a service credential is used to establish an ESM context. Different service credentials may be used to establish different ESM contexts. In one example, the NAS model enables the establishment of an EMM context and one or more ESM contexts (e.g., connectivity context 122 and EMM/ESM context 126 of FIG. 1) simultaneously at a HMME using the same set of credentials.

Referring to FIG. 1, once the connectivity context 122 is established (i.e., creating a connection to a network over a single radio link 101), the client device 102 may establish one or more ESM contexts with different network entities based on the corresponding sets of credentials (e.g., different service credentials), which allow service differentiation by differentiated connection management entities in the connectivity provider(s). An example of the connection management entity is a Service Management Entity (SME).

In one aspect of the disclosure, a RAN 120 may be connected to a plurality of service providers 104 and 106. For example, each service provider 104, 106 may include a connectivity provider having a service management entity (SME) 128 and 130 as well as one or more Packet Data Network Gateways (P-GWs) and one or more Serving Gateways (S-GWs) 132 and 134. Each of these SMEs 128 and 130 may maintain respective ESM contexts 136 and 138 for service connections 114 and 116 established using the credential and subscription information that may be supplied by the corresponding Service AAA (authorization, authentication, and accounting) servers. For example, the SMEs 128 and 130 may authenticate the client device 102 via or supported by respective Service AAA servers 140 and 142 to ascertain whether the service connection 114 and/or 116 should be setup based on the credentials associated with the service contexts 108 and 110 and provided by AAA servers 140 and 142. Successful authentication enables the SMEs to establish service contexts 108 and 110 (e.g., ESM contexts) for the client device 102. Corresponding service contexts (ESM contexts 136, 138) may be established at the SMEs 128 and 130.

In the exemplary illustration of FIG. 1, the client device 102 has established a first service context 108, a second service context 110, and a third service context 112. However, it is contemplated that any number of service contexts may be established by the client device 102.

In FIG. 1, the multiple service contexts 108, 110, and 112 may be established by the client device 102 and multiple service providers (e.g., service networks 104 and/or 106), where each service context 108, 110, and 112 may correspond to one or more sets of credentials. A set of credentials may be defined as, or include, a set of information that enables other devices (e.g., network devices) to identify the client device 102 (or user/subscriber of the client device) to a service or connectivity, security keys used for authentication, etc. A credential may be implemented as a security context. For example, the authentication information stored at the client device and the corresponding information stored at the network side may be called a security context.

In one example, the connections 114, 116, and 118 based on the multiple simultaneous service contexts 108, 110, and 112 may be multiplexed over a single connection with the RAN 120, for example, a Layer 2 connection of a communication protocol stack (e.g., LTE Layer 2). The service contexts 108, 110, and 112 are distinguished based on specific/distinct identities used by the client device 102 for establishing each service context 108, 110, and 112. For example, the client device 102 may be provisioned with a set of credentials that provide security access to connectivity establishment with a Host MME (i.e. at least an EMM context) that provides a signaling or connection to the network and enables mobility management. Such credentials can be, for instance, out-of-the-box credentials, operator credentials, or credentials provided by an OEM (original equipment manufacturer) and installed in the client device 102 at manufacturing by an entity manufacturing the client device 102. The use of OEM credentials enables an OEM to provide the credentials and host the authentication for such credentials, thus enabling the client device 102 to support different service providers since service provider credentials are used to provide ESM context only, not EMM or connectivity context. With the use of OEM credentials for establishment of the first (EMM) context (e.g., a connectivity context), it is possible to establish an EMM (connectivity) context that provides signaling, mobility management, security, etc. without incurring a charge or fee for establishing such connectivity, since no data traffic or messages are generated in relation to this context.

Service-related credentials are used to establish one or more ESM context(s) (e.g., service contexts) with an SME (Service Management Entity). In various configurations, the SME may be physically separated from the HMME, the SME (or a software version of the SME functionality) may be co-located or hosted at the HMME, or a combination thereof where some SMEs may be co-located/hosted by the HMME and other SMEs are separated from the HMME. In some examples, the UE may establish ESM context(s) with the connectivity credentials.

AS Security

The access stratum (AS) is a functional layer and a set of protocols that handle activities between a client device 102 (e.g., UE) and a core network (CN) via a RAN 120. For example, the CN may include a HMME 124, one or more SME(s) 128, 130, one or more S-GWs 132, 134, and one or more P-GWs 132, 134. In the AS, multiple radio access bearers (RABs) may be established between a CN and the client device 102. In one aspect of the disclosure, each RAB may be associated with a different ESM context, and each ESM context may be determined by a virtual ESM (VESM) tag (or identifier). In one aspect of the disclosure, multiple RABs are associated with the same EMM context. In this case, the RAN 120 (e.g., eNode B or eNB) has no visibility of the multiple ESM contexts. That is, the RAN 120 may not distinguish the data traffic among the EMS contexts. The eNB has a set of RABs, some corresponding for example to a first ESM context and some to a second ESM context, and the HMME has a mapping of the RABs to the specific ESM contexts.

In FIG. 1, the RAN 120 is depicted as existing within an access stratum. However, the RAN 120 also provides NAS functions. Among the services provided by the access stratum is the transport of NAS messages between NAS entities (e.g., client devices and core network nodes). NAS protocols support the mobility of the client devices and the procedures for establishing and maintaining the connectivity between a client device and a core network. For example, the NAS protocols may be used to transport NAS messages between a client device 102 and a core network (CN) of service provider A and/or a CN of service provider B depicted in FIG. 1. While the access stratum (AS) transports NAS signaling. NAS signaling is not terminated at the access stratum. In one aspect of the disclosure, the single radio link 101 (e.g., an RRC link) between the client device 102 and the RAN 120 may be split logically or virtually into multiple service connections, for example, service connections 114 and 116. The service connections are established in association with their corresponding service contexts (e.g., ESM contexts 136 and 138).

Device Identifiers

Various client device identifiers may be used to identify a client device 102 (e.g., UE) in the AS and/or NAS in order to enable multiple service connections via a single link. Some non-limiting examples include an International Mobile Subscriber Identity (IMSI), a Globally Unique Temporary UE Identity (GUTI), a Subscriber Service Identity (SCSI), a Temporary SCSI (T-SCSI), a Globally Unique Temporary Session Identity (GUTSI), and a Temporary Transport Identifier (TTI). For example, in the connectivity context 122, the GUTI of a client device 102 may be mapped to the GUTSI of each service context (e.g., service contexts 108, 110, and 112) active in the client device. Therefore, the connections to different service providers based on the service contexts may be identified by the HMME 124 using suitable client device identifiers.

In one aspect of the disclosure, the SCSI may be a permanent identity that the client device (UE) provides to an SME for authentication (similar to an IMSI in typical UE-MME authentication). The SCSI may identify a specific UE subscription and the related credentials. The SCSI may be used by an SME to identify an AAA or authentication/authorization server, which is used to retrieve the corresponding client subscription profile and authenticate the client device.

In one aspect of the disclosure, the T-SCSI may be a temporary identifier that may be allocated to identify the client device (e.g., UE) in subsequent signaling between the client device and the SME. In some examples, the T-SCSI may not always be used and/or may not always be allocated. If the SME provides a T-SCSI to the client device, the client device may use it in the subsequent signaling between the client device and the SME.

In one aspect of the disclosure, the GUTSI may be allocated by an SME to the client device upon successful authentication. The GUTSI may be used by the client device in all signaling or data exchanged between the client device and the same SME. In one example, the client device provides the allocated GUTSI outside an NAS payload (which contains the actual message between the client device and the SME) to identify which client device the NAS payload transported between the client device and the HMME belongs to. In another example, the client device may provide the GUTSI inside an NAS payload. The HMME may use the GUTSI to differentiate and/or identify to which SME the signaling sent from the client device is directed. For instance, when a UE-SME NAS message is encapsulated in an NAS message between the client device (e.g., UE) and the HMME, the client device provides the GUTSI in association with the UE-SME NAS message to indicate to the HMME which SME to send the NAS message to and which client device this UE-SME NAS message corresponds to.

In one aspect of the disclosure, the Temporary Transport Identifier (TTI) may be allocated by the SME for a service context between the client device and the SME in order to identify in the HMME the relationship between an ESM context of a client device and the corresponding SME. Upon receiving signaling containing the TTI, the HMME uses the TTI to identify the corresponding client device or SME and forward the signaling to the identified client device or SME.

In one aspect of the disclosure, the client device may provide, during the requests to establish a service connection or service context, an identifier used by the client device to identify the network or service for which the service context establishment is being requested. This may be an Access Point Name (APN), or any suitable identifier for the service. The above-described device identifiers are illustrative in nature and not restrictive. Other suitable device identifiers may be used to facilitate the communication between a client device and an HMME/SME in other aspects of the present disclosure.

Exemplary Client Device

Figure 2:
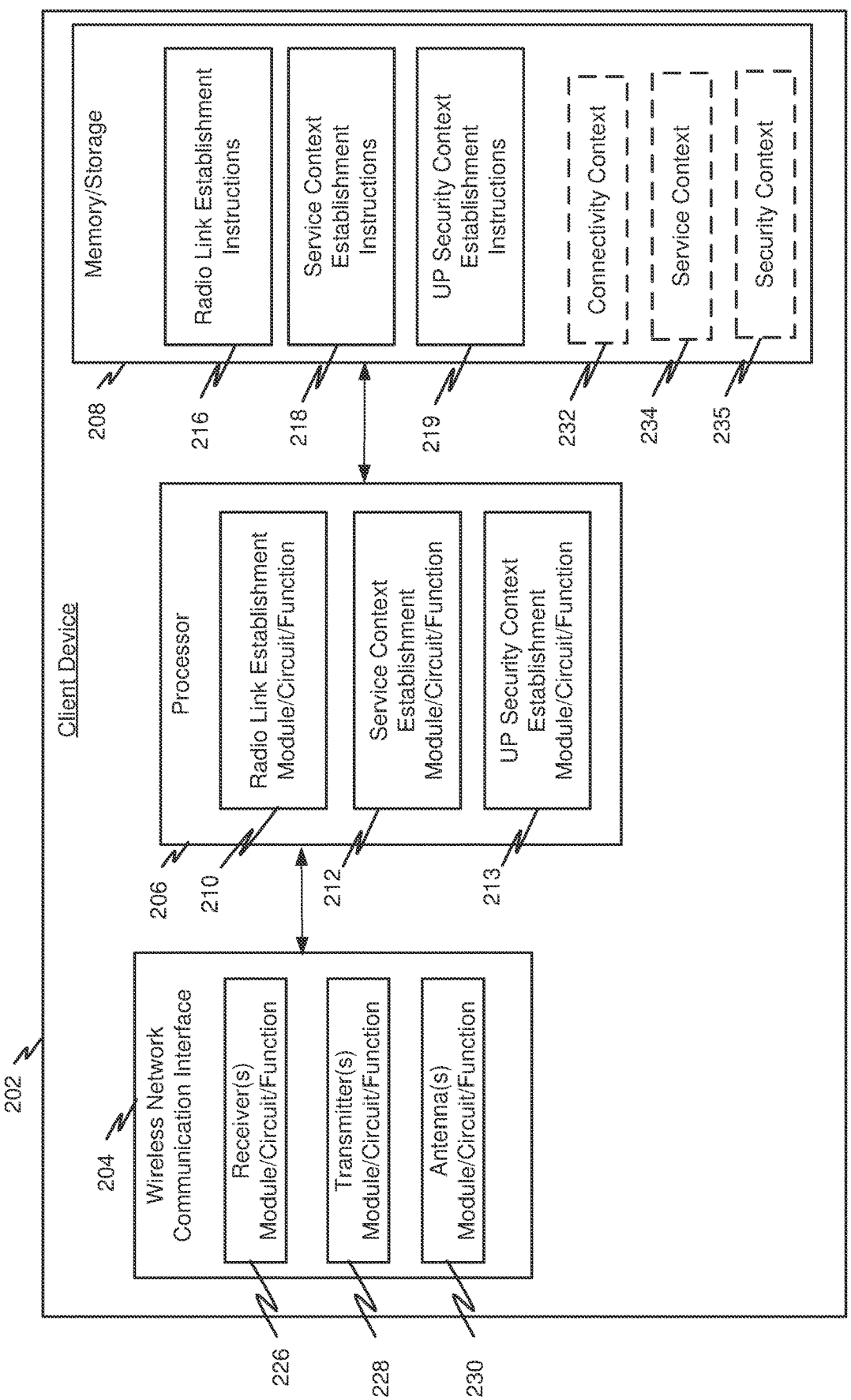
FIG. 2 illustrates an exemplary client device configured to use a single radio link to support multiple simultaneous service contexts, in accordance with an aspect of the disclosure.

FIG. 2 illustrates an exemplary client device 202 configured to use a single radio link to support multiple simultaneous service contexts or connections. The client device 202 may be the same as any of the UEs or client devices described in FIGS. 1, 4-8, 10, 11, and 14-18. The client device 202 may include a wireless network communication interface 204, one or more processors 206, and a memory/storage 208 that may be operationally coupled to one another. The various functionalities of the client device 202 may be implemented in software, firmware, hardware, or any combination thereof.

The wireless network communication interface 204, may serve to connect the client device 202 to one or more entities or networks via one or more radio access networks using one or more wireless access technologies that facilitate establishing a wireless link or connection to other devices/networks/services. In one example, the wireless network communication interface 204 may be configured to facilitate wireless communications of the client device 202 with other wireless entities or networks. The wireless network communication interface 204 may include one or more receiver module/circuit/functions 226, one or more transmitter module/circuit/functions 228, and/or one or more antenna module/circuit/functions 230. The receiver(s) 226, transmitter(s) 228, and antenna(s) 230 may be operationally coupled to one another. The one or more antennas 230 may facilitate wireless communication with one or more wireless devices, networks, and/or services.

The processor 206 may be operationally coupled to the wireless network communication interface 204. The processor 206 may include a radio link establishment module/circuit/function 210, a service context establishment module/circuit/function 212, and a user plane (UP) security context establishment module/circuit/function 213.

The processor 206 may be configured for processing, including the execution of computer executable code or programming, which may be stored on the memory/storage device 208. The memory/storage device 208 may include radio link establishment instructions 216, service context establishment instructions 218, and security context establishment instructions 219. In some examples, the memory/storage device 208 may also store a connectivity context 232, one or more service contexts 234, one or more security contexts 235, and other data being utilized by the processor 206.

The client device 202 may be used to implement one or more of the functions and/or procedures illustrated in FIGS. 7-11 and 19-20.

Exemplary Network Node

Figure 3:
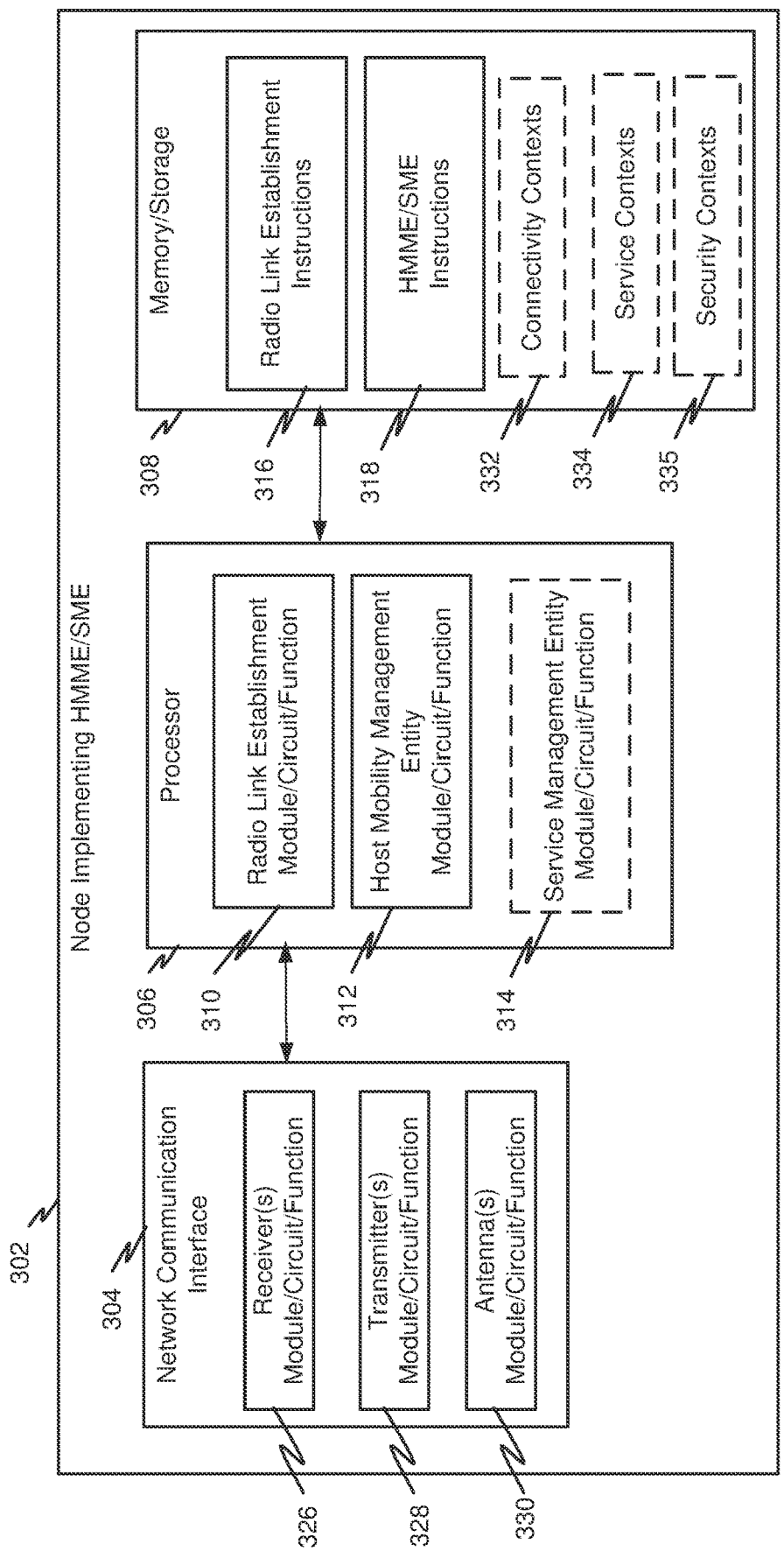
FIG. 3 illustrates an exemplary network node implementing a host mobility management entity (HMME) and/or service management entity (SME) configured to support a client device in operating on a single radio link while supporting simultaneous operation of multiple service contexts, in accordance with an aspect of the disclosure.

FIG. 3 illustrates an exemplary network node 302 configured to implement an HMME and/or SME to support client devices operating on a single radio link that supports simultaneous or concurrent operation of multiple service contexts. The network node 302 may be the same as any of the network nodes or entities described in FIGS. 1, 4-8, and 10-18. The network node 302 may include a network communication interface 304, one or more processors 306, and a memory/storage 308 that may be operationally coupled to one another.

The network communication interface 304, may serve to couple the network node 302 to one or more networks or client devices using one or more wired or wireless access technologies that facilitate establishing a link between client devices and network node. The network communication interface 304 may include at least one receiver module/circuit/function 326 and/or at least one transmitter module/circuit/function 328. The network communication interface 304 may also include one or more antenna modules/circuits/functions 330 operationally coupled to the at least one receiver 326 and/or at least one transmitter 328.

The processor 306 may be operationally coupled to the network communication interface 304. The processor 306 may include a radio link establishment module/circuit/function 310, and an HMME module/circuit/function 312.

The processing circuit 306 may be configured for processing, including the execution of instructions, which may be stored on the memory/storage 308. As used herein, the term "instructions" may be construed broadly to include without limitation instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The memory/storage 308 may be operationally coupled to the processor 306 and may also be operationally coupled to the network communication interface 304. The memory/storage 308 may include radio link establishment instructions 316 and HMME/SME instructions 318.

In some examples, the memory/storage 308 may store connectivity contexts (or credentials) 332, service contexts (or credentials) 334, and/or security contexts 335. Additionally, in some implementations, the processor 306 may implement a service management entity (SME) module/circuit/function 314 with or without the HMMM module 312.

The network node 302 may implement one or more of the functions and/or procedures illustrated in FIGS. 7, 8, 10-13, and 22-22. In one particular example, the network node 302 may implement one or more of the processes described in relation to FIG. 20.

HMME Control Plane Models

Figure 4:
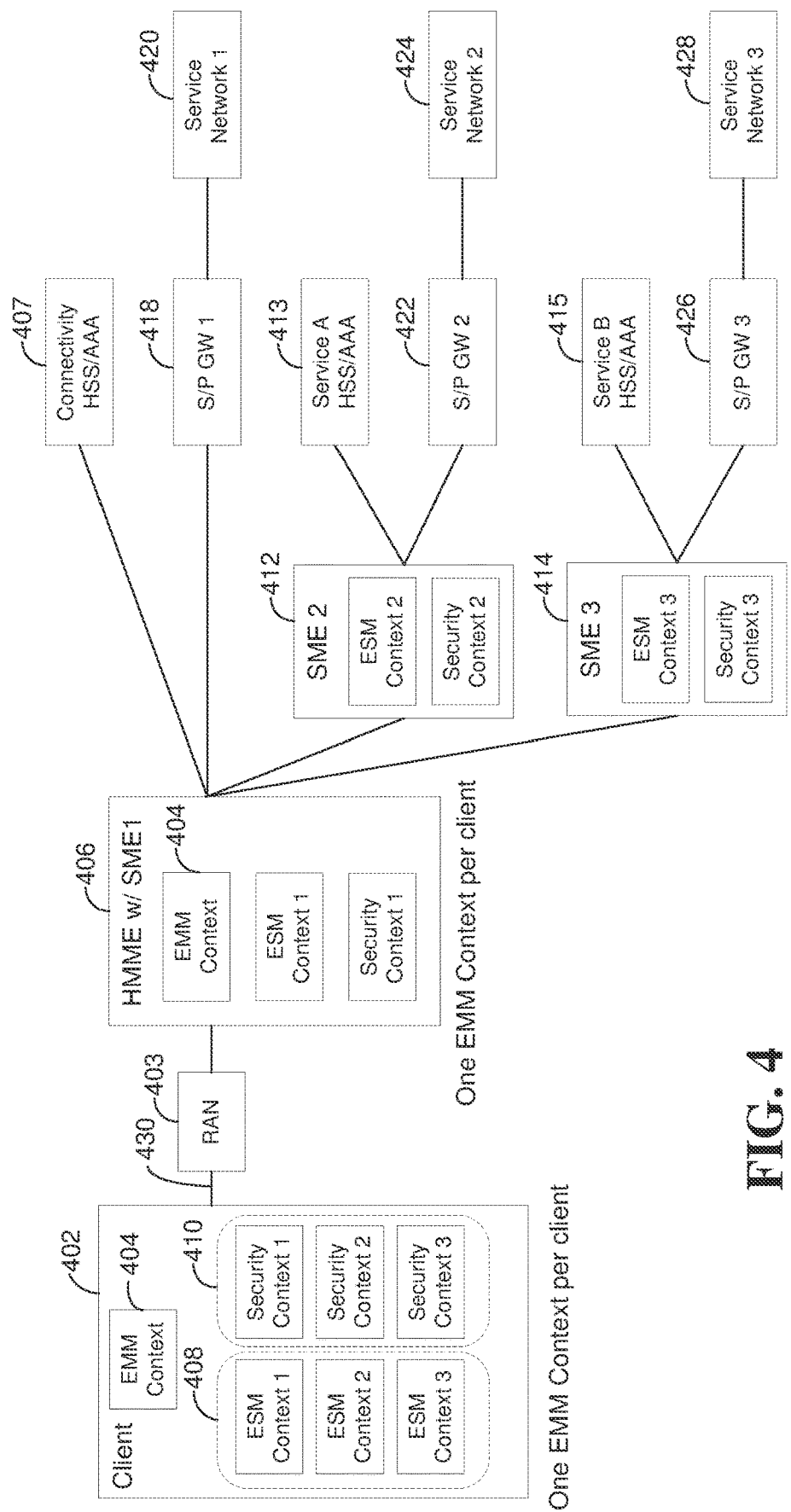
FIG. 4 is a diagram illustrating a first example of a HMME control plane model in accordance with an aspect of the disclosure.
Figure 5:
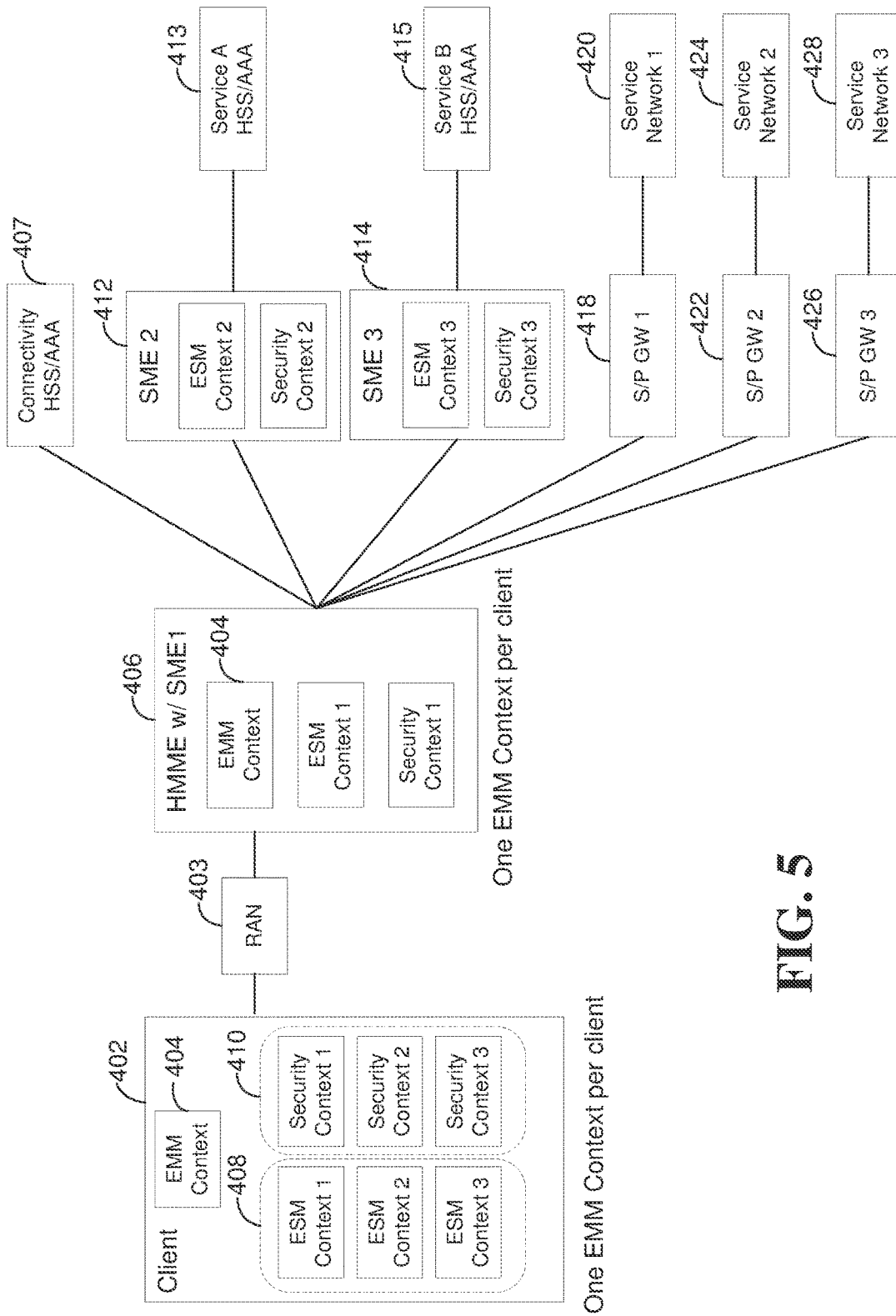
FIG. 5 is a diagram illustrating a second example of an HMME control plane model in accordance with an aspect of the disclosure.
Figure 6:
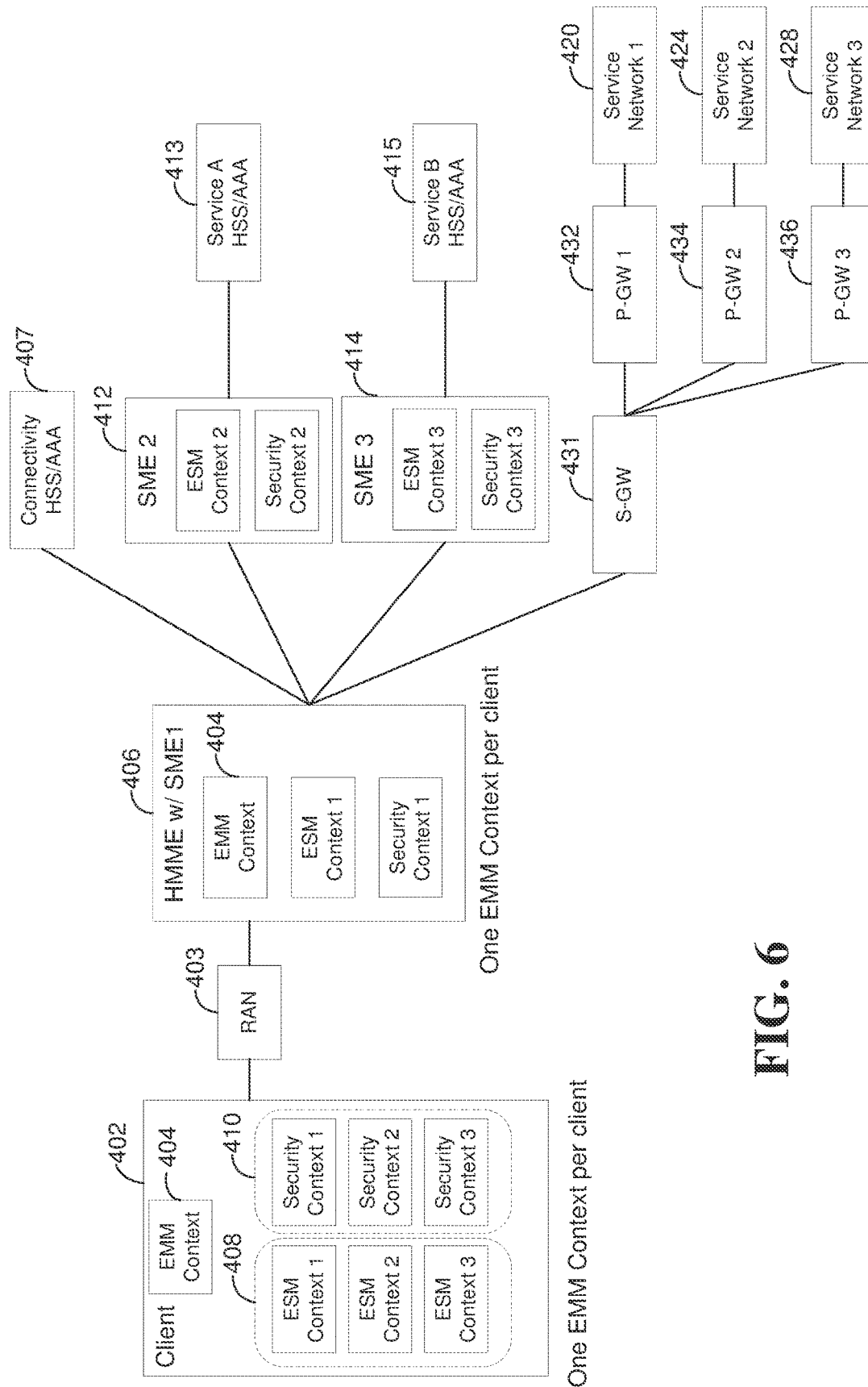
FIG. 6 is a diagram illustrating a third example of an HMME control plane model in accordance with an aspect of the disclosure.

In various examples, a client device may establish a connection or connectivity with an access network (e.g., RAN) based on a single EMM context at an HMME. Once the connectivity is established, the client device establishes one or more ESM contexts corresponding to different sets of credentials with different SMEs. FIGS. 4-6 are drawings illustrating some examples of HMME control plane models for facilitating the establishment of the EMM context and ESM contexts in accordance with some aspects of the disclosure.

In a first HMME control plane model illustrated in FIG. 4, a client device 402 (e.g., UE) establishes an EMM context 404 (connectivity context) with an HMME/SME 406 by authenticating each other using, for example, a connectivity credential and a home authorization, authentication, and accounting (AAA) server 407. The single EMM context 404 facilitates the establishment of a single radio link between the client device 402 and an RAN 403 (e.g., eNB). Once the EMM context 404 has been established, the client device 402 may establish one or more ESM contexts 408 (ESM contexts 1, 2, 3) with a number of SMEs (HMME/SME 406, SME 412, SME 414) using a number of service credentials and AAA servers 407, 413, 415. NAS messages between the client device 402 and the HMME 406 (for the HMME function) may be encrypted and integrity protected based on a default connectivity security context (e.g., NAS security context) stored in the HMME 406. NAS messages between the client device 402 and SMEs are encrypted and integrity protected using different security contexts 410 (NAS security contexts) respectively stored in the SMEs. The client device 402 and each SME authenticate each other using a corresponding service credential. In this example of FIG. 4, the first ESM context (ESM context 1) is protected using a first security context (security context 1), which is stored in the client device 402 and first SME 406. The second ESM context (ESM context 2) is protected using a second security context (security context 2), which is stored in the client device 402 and second SME 412. The third ESM context (ESM context 3) is protected using a third security context (security context 3), which is stored in the client device 402 and third SME 414.

The HMME/SME 406 is configured to select a first service/packet data gateway (SIP GW) 418, which is connected to a first service network 420. Similarly, the second SME 412 is configured to select a second S/P GW 422, which is connected to a second service network 424. Likewise, the third SME 414 is configured to select a third S/P GW 426, which is connected to a third service network 428. The first, second and third service networks 420, 424, 428 may be operated by the same service provider or different service providers. In some examples, the service gateway (S-GW) selection may be performed by the HMME 406. In such case, the HMME 406 informs the SMEs of the selected S-GW, for example, during a service request.

A service network may be a virtual network that is at least partially established in the connectivity network (e.g., including the single radio link 430 and the RAN 403), and the one or more service networks are associated with specific or different services provided by one or more service providers (e.g., service networks 1, 2, and 3). In one particular example, a first virtual network includes the radio link 430, RAN 403, first HMME/SME 406, first S/P GW 418, and first service network 420. In another example, a second virtual network includes the radio link 430, RAN 403, HMME 406, second SME 412, second S/P GW 422, and second service network 424. In another example, a third virtual network includes the radio link 430, RAN 403, HMME 406, third SME 414, third S/P GW 426, and third service network 428.

FIG. 5 illustrates a second HMME control plane model in accordance with an aspect of the disclosure. The first and second HMME control plane models are similar, and therefore redundant description may be omitted for brevity. A client device 402 establishes an EMM context 404 with an HMME 406. Once the EMM context 404 has been established, the client device 402 may establish one or more ESM contexts 408 (ESM contexts 1, 2, 3) with a number of SMEs (HMME/SME 406, SME 412, SME 414) using a number of service credentials and AAA servers 407, 413, 415. The client device 402 and each SME 406, 412, 414 may authenticate each other using a corresponding service credential. For example, the client device 402 may use three different credentials for the SMEs. In the second HMME control plane model of FIG. 5, the HMME 406 may directly select and control the service/packet data gateways (e.g., S/P GW 1, 2, 3) for the service connections. That is different from the first HMME control plane model of FIG. 4 in which the SMEs select the service/packet data gateways. In another aspect of the disclosure, an SME (e.g., SME 412 and SME 414) may select an S/P GW and forwards the selection to the HMME 406, which selects the selected S/P GW.

FIG. 6 illustrates a third HMME control plane model in accordance with an aspect of the disclosure. The first and third HMME control plane models are similar, and therefore redundant description may be omitted for brevity. A client device 402 establishes an EMM context 404 with an HMM 406. Once the EMM context 404 has been established, the client device 402 may establish one or more ESM contexts 408 (ESM contexts 1, 2, 3) with a number of SMEs (HMME/SME 406, SME 412. SME 414) using a number of service credentials and AAA servers 407, 413, 415. The client device 402 and each SME may authenticate each other using a service credential. For example, the client device 402 may have different service credentials for the service connections. In the third HMME control plane model, the HMME 406 may select a service gateway (S-GW) 431 based on the ESM contexts 408 (e.g., ESM contexts 1, 2, 3). Then, the S-GW 431 selects the packet data gateways (P-GWs 432, 434, 436) based on the ESM contexts 408. That is different from the first HMME control plane model of FIG. 4, in which the SMEs select the service and packet data gateways. In some examples, an SME (e.g., SME 412 and SME 414) may select a packet data gateway (e.g., P-GWs 1, 2, 3) and may forward the selection to the S-GW 431 via the HMME 406. Then the S-GW 431 selects the corresponding packet data gateway(s). In the HMME control plane models of FIGS. 4-6, the different service connections may be protected with different security contexts 410 (e.g., security context 1, 2, 3).

Figure 7:
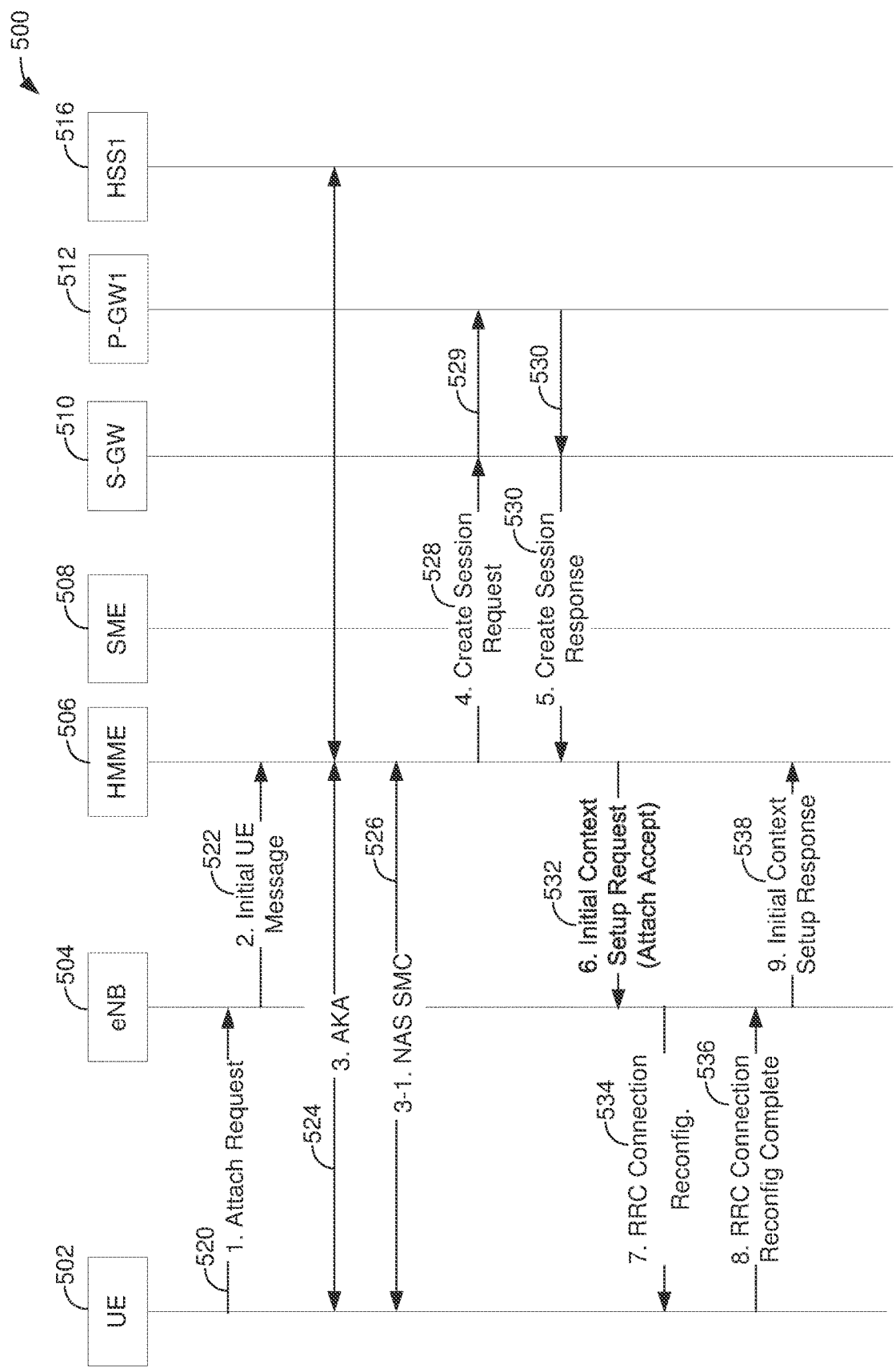
FIGS. 7 and 8 are a call flow diagram illustrating a first signaling process performed between a client device and a network using a single connectivity context to establish a plurality of separate service contexts, in accordance with an aspect of the disclosure.
Figure 8:
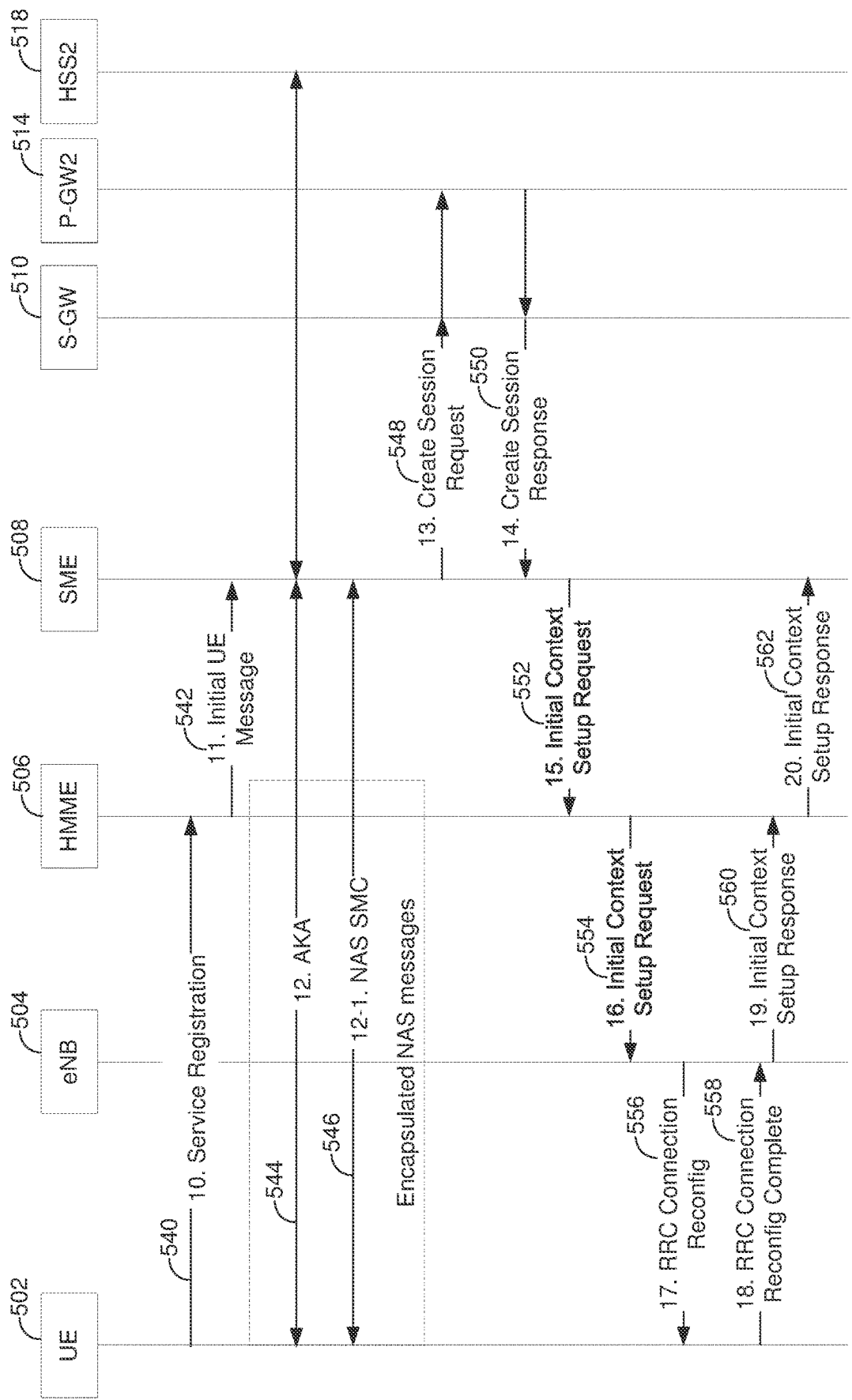
Figure 9:
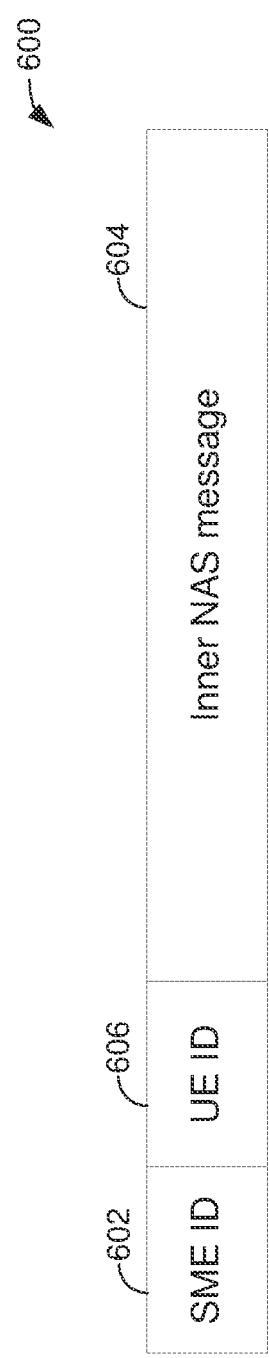
FIG. 9 is a diagram illustrating an encapsulated non-access stratum (NAS) message in accordance with an aspect of the disclosure.

FIGS. 7-8 are a call flow diagram 500 illustrating a process for establishing multiple service contexts using a single connectivity context in accordance with an aspect of the present disclosure. In one example, the process may be performed by a UE (client device) 502, an eNB 504, an HMME 506, an SME 508, a service gateway (S-GW) 510, a first packet data gateway (P-GW) 512, a second P-GW 514, a rust home subscriber server (HSS) 516, and a second HSS 518. As illustrated in the call flow diagram 500, a radio link or connection is established between the UE 502 and the network (e.g., eNB 504) using a single connectivity context (e.g., EMM context), which is then shared by a plurality of service contexts (e.g., SME contexts). The UE 502, eNB 504, HMME 506. SME 508, S-GW 510, first P-GW 512, second P-GW 514, first HSS 516, and second HSS 518, may be the same as those illustrated in any of FIGS. 1-6 and 14-18.

The UE 502 attempts to attach to a network by sending an Attach Request 520 to the eNB 504, which sends or forwards the request to the HMME 506 in an Initial UE Message 522. The Initial UE message may include a UE ID such that the HMME 506 may identify the client device 502. The UE ID may be any of the device identifiers described above. The HMME 506 determines whether or not the UE 502 has the proper credential for the requested connection. For example, the HMME 506 may check whether the UE 502 is permitted to attach or not by performing an Evolved Packet System (EPS) Authentication and Key Agreement (AKA) procedure 524 with the first HSS 516. For example, the first HSS 516 may derive an MME base key, by generating authentication vectors and sending them to the HMME 506, which then performs authentication with the UE 502, on behalf of the first HSS 516. Then the HMME 506 performs an NAS security setup procedure with the UE 502 by exchanging NAS Security Mode Command (SMC) messages 526. NAS SMC messages between the UE 502 and HMME 506 may be encrypted and integrity protected, for example, based on an NAS security context (if established) stored in the HMME 506 if NAS SMC is completed. Next, the HMME 506 selects an S-GW 510 based on an S-GW selection function and allocates an EPS Bearer Identity for the default bearer for the UE 502. Then, the HMME 506 sends a Create Session Request 528 to the selected S-GW 510. In response, the S-GW 510 creates a new entry in its EPS Bearer table and sends a Create Session Request message 529 to the first P-GW 512.

In response to the Create Session Request message 529, the first P-GW 512 may create a new entry in its EPS Bearer table and generate a Charging ID. Then the first P-GW 512 sends a Create Session Response message 530 to the S-GW 510 and HMME 506. Next, the HMME 506 provides the eNB 504 with an Initial Context Setup Request message 532 that contains an Attach Accept message. Next, the eNB 504 sends an RRC Connection Reconfiguration message 534 to the UE 502, including the EPS Radio Bearer Identity and Attach Accept message. In response, the UE 502 sends an RRC Connection Reconfiguration Complete message 536 to the eNB 504. In response, the eNB 504 sends an Initial Setup Context Response message 538 to the HMME 506.

Utilizing the above-described procedure, the UE 502 can establish an EMM context or connectivity with the HMME 506. For example, this procedure may be used with the first HMME control plane model illustrated in FIG. 4. After the EMM context is established, the UE 502 may establish one or more SME contexts using the following procedure described in relation to FIG. 8.

Referring to FIG. 8, in order to establish an ESM context for a service or service connection, the UE 502 sends a Service Registration message 540 including a service identifier (service ID) to the HMME 506. Upon receipt of the Service Registration message 540, the HMME 506 selects an SME (e.g., SME 508) based on the service ID provided by the UE 502 and sends an Initial UE message 542 to the selected SME 508. The Initial UE message 542 may include a client device identifier (e.g., SCSI) as described above such that the SME 508 may identify the UE 502. The SME 508 may check whether the UE 502 has a subscription for service or not by performing an EPS-AKA procedure 544 with the second HSS 518. For example, the second HSS 518 may derive a key, by generating authentication vectors and sending them to the SME 508, which then performs authentication with the UE 502, on behalf of the second HSS 518. Then the SME 508 performs an NAS security setup procedure with the UE 502 by exchanging NAS Security Mode Command (SMC) messages 546.

The NAS messages between the UE 502 and the SME 508 may be protected using ESM security contexts. For example, the UE 502 may encrypt and protect an NAS message using an ESM security context established with the SME 508. The NAS message for the SME 508 is encapsulated in an outer NAS message for the HMME 506. (i.e., encapsulated NAS-in-NAS message). For example, the outer NAS message is encrypted and integrity protected using the security context established between the UE 502 and the HMME 506. In one example, referring to FIG. 9, an encapsulated NAS-in-NAS message 600 for the HMME may include an SME ID 602 to enable the HMME to identify the SME 508 to which an inner NAS message 604 is forwarded and a UE ID 606

(which may be assigned by the SME) to enable the SME 508 to identify the UE 502. In one example, the UE ID 606 may include a GUTI or GUTSI (or other suitable identifier) that has been allocated by SME.

Similarly, the SME 508 may encrypt and protect an NAS message using an ESM security context. Then the NAS message (e.g., inner NAS message 604) is encapsulated in an outer NAS message (or any other suitable container that may be defined) for the HMME 506. In one example, the outer NAS message may not be protected, but transported to the HMME 506 via a secure channel. In one example, the HMME 506 and SME 508 may establish an IP Security (IPsec) channel for secured communication. The outer NAS message may include the UE ID to enable the HMME 506 to map the UE ID to an S1-AP UE ID. In another example, the outer NAS message may be encrypted and integrity protected using an EMM security context of the HMME 506.

Then, the SME 508 sends a Create Session Request 548 to the S-GW 510. In response, the S-GW 510 creates a new entry in its EPS Bearer table and sends a Create Session Request message to the second P-GW 514. In response to the Create Session Request message, the second P-GW 514 may create a new entry in its EPS Bearer table and generate a Charging ID. Then the second P-GW 514 sends a Create Session Response message 550 to the S-GW 510 and SME 508. Next, the SME 508 provides the HMME 506 with an Initial Context Setup Request message 552 that contains an Attach Accept message. The HMME 506 forwards an Initial Context Setup Request message 554 to the eNB 504. Next, the eNB 504 sends an RRC Connection Reconfiguration message 556 to the UE 502, including the EPS Radio Bearer Identity and Attach Accept message. In response, the UE 502 sends an RRC Connection Reconfiguration Complete message 558 to the eNB 504. Next, the eNB 504 sends an Initial Setup Context Response message 560 to the HMME 506, which forwards the Initial Setup Context Response message 562 to the SME 508. With the above-described procedure, an SME context is established with the SME 508.

Moreover, AS Security Mode Command (SMC) messages may be used to establish an AS security context between the UE 502 and eNB 504. Based on an AS security context (e.g., AS security contexts shown in FIGS. 15-17), the UE 502 and eNB 504 can protect the over-the-air traffic. Although a single radio link (e.g., single link 101 of FIG. 1) is used for multiple service connections, each service connection can be protected with a separate key based on the corresponding AS security context and distinguished by the corresponding virtual ESM (VESM) tag.

Figure 10:
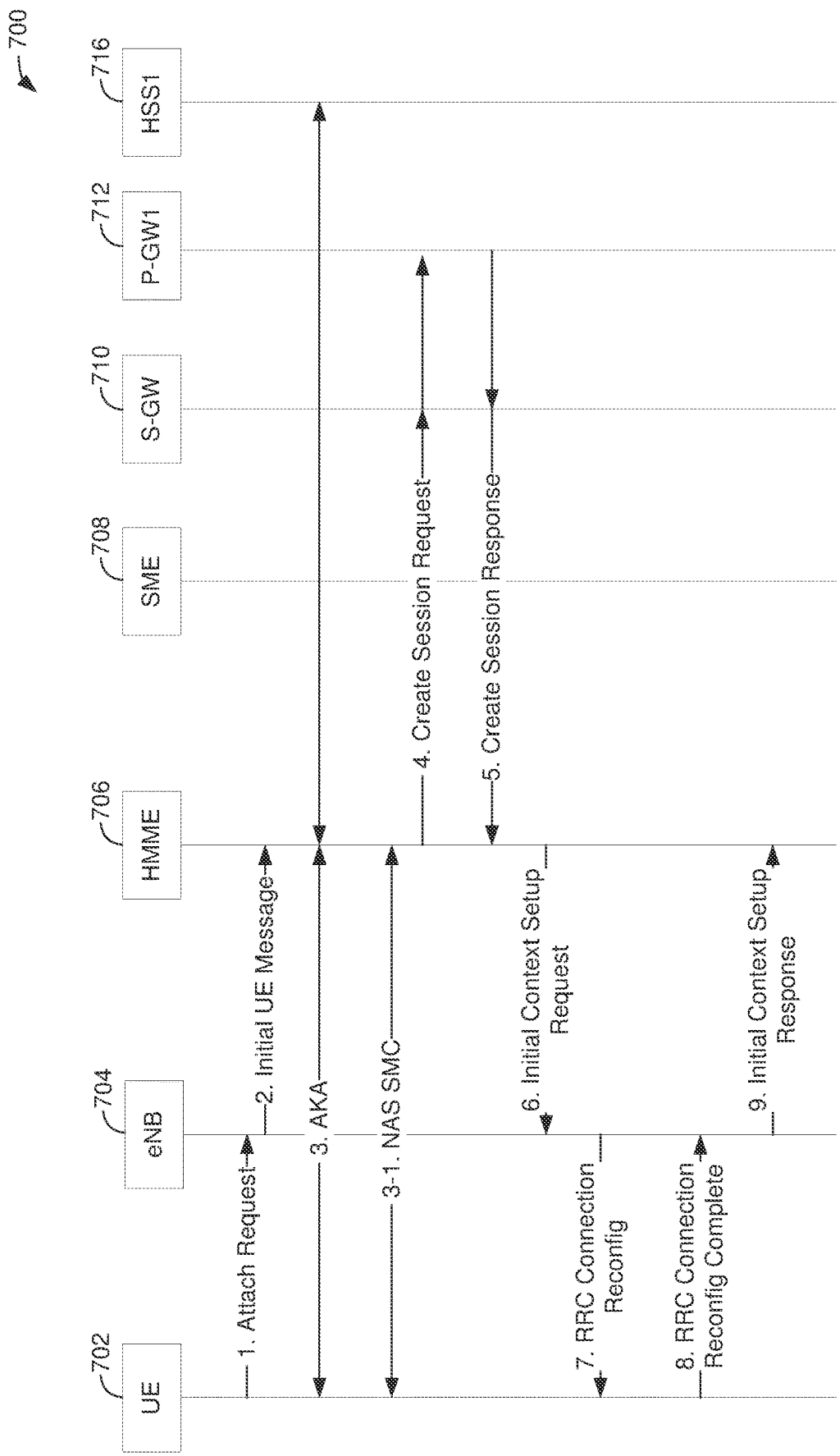
FIGS. 10 and 11 are a call flow diagram illustrating a second signaling process performed between a client device and a network using a single connectivity context to establish a plurality of separate service contexts, in accordance with an aspect of the disclosure.
Figure 11:
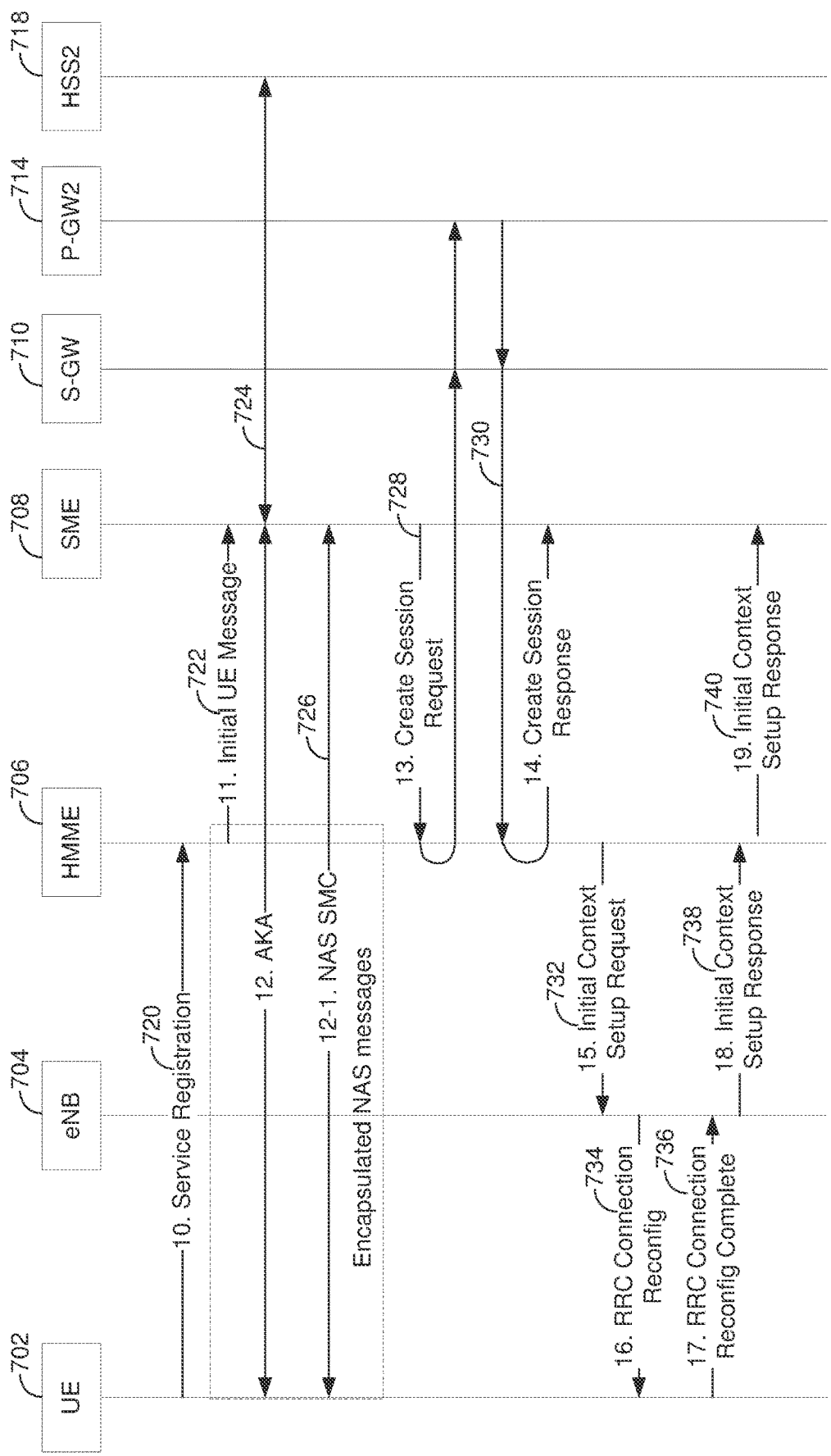

FIGS. 10-11 are a call flow diagram 700 illustrating a procedure for establishing multiple service contexts using a single connectivity context in accordance with an aspect of the present disclosure. In one example, the process may be performed by a UE (client device) 702, an eNB 704, an HMME 706, an SME 708, a service gateway (S-GW) 710, a first packet data gateway (P-GW) 712, a second packet data gateway P-GW 714, a first home subscriber server (HSS) 716, and a second HSS 718, to establish a radio link or connection using a single connectivity context (e.g., EMM context) at the UE 702, which is then shared for a plurality of service contexts (e.g., SME contexts) or service connections. The client device (UE) 702, eNB 704, HMME 706, SME 708, S-GW 710, first P-GW 712, second P-GW 714, first HSS 716, and second HSS 718, may be the same as those illustrated in any of FIGS. 1, 4-6, and 14-18.

The flow diagram 700 is substantially similar to the flow diagram 500 of FIG. 7-8. Therefore, redundant description may be omitted for brevity. For example, the signaling procedure illustrated in FIG. 10 establishes an EMM context between the UE 702 and HMME 706, and is substantially the same as that illustrated in FIG. 7.

Referring to FIG. 11, in order to establish an ESM context for a service or service connection, the UE 702 sends a Service Registration message 720 including a service identifier (service ID) to the HMME 706. Upon receipt of the Service Registration message 720, the HMME 706 selects an SME (e.g., SME 708) based on the service ID provided by the UE 702 and sends an Initial UE message 722 to the selected SME 708. The Initial UE message 722 may include a client device identifier (e.g., SCSI) as described above such that the SME 708 may identify the UE 702. The SME 708 may check whether the UE 702 has a subscription of service or not by performing an EPS-AKA procedure 724 with the second HSS 718. For example, the second HSS 718 may derive a key, by generating authentication vectors and sending them to the SME 708, which then performs authentication with the UE 702, on behalf of the second HSS 718. Then the SME 708 performs an NAS security setup procedure with the UE 702 by exchanging NAS Security Mode Command (SMC) messages 726.

The NAS messages between the UE 702 and the SME 708 may be protected using ESM security contexts. For example, the UE 702 may encrypt and protect an NAS message using an ESM security context established with the SME 708. For example, the NAS message for the SME 708 is encapsulated in an outer NAS message for the HMME 706. (i.e., encapsulated NAS-in-NAS message). The outer NAS message is encrypted and integrity protected using the security context established between the UE 702 and the HMME 706. An encapsulated NAS-in-NAS message for the HMME 706 may include an SME ID to enable the HMME 706 to identify the SME 708 to which an inner NAS message is forwarded and a UE ID (which may be assigned by the SME) to enable the SME 708 to identify the UE 702. In one example, the UE ID may include a GUTI or GUTSI (or other suitable identifiers) that has been allocated by SME.

Similarly, the SME 708 may encrypt and protect an NAS message using an ESM security context. Then the NAS message (inner NAS message) is encapsulated in an outer NAS message (or any other suitable container that may be defined) for the HMME 706. In one example, the outer NAS message may not be protected, but transported to the HMME 706 via a secure channel. In one example, the HMME 706 and SME 708 may establish an IP Security (IPsec) channel for secured communication. The outer NAS message may include the UE ID to enable the HMME 706 to map the UE ID to an S1-AP UE ID. In another example, the outer NAS message may be encrypted and integrity protected using the EMM security context of the HMME 706.

The UE 702 may establish one or more SME contexts using the following described procedure. For example, referring to FIG. 11, the SME 708 sends a Create Session Request 728 to the S-GW 710 via the HMME 706. In response, the S-GW 710 creates a new entry in its EPS Bearer table and sends a Create Session Request message 728 to the second P-GW 714. In response to the Create Session Request message, the second P-GW 714 may create a new entry in its EPS Bearer table and generate a Charging ID. Then the second P-GW 714 sends a Create Session Response message 730 to the S-GW 710, which forwards the message to the SME 708 via the HMME 706. Next, the HMME 706 sends an Initial Context Setup Request message 732 to the eNB 704. Next, the eNB 704 sends an RRC Connection Reconfiguration message 734 to the UE 702, including the EPS Radio Bearer Identity and Attach Accept message. In response, the UE 702 sends an RRC Connection Reconfiguration Complete message 736 to the eNB 704. Next, the eNB 704 sends an Initial Context Setup Response message 738 to the HMME 706, which forwards the Initial Context Setup Response message to the SME 708.

Utilizing the above-described procedure, the UE 702 can establish one or more ESM contexts or service connections with the SME(s) (e.g., SME 708). For example, this procedure may be used in the second and third HMME control plane models illustrated in FIGS. 5 and 6.

In one aspect of the disclosure, the communication between an eNB and an HMME/SME may use the S1AP (S1 Application Protocol) as defined in the 3GPP specification. An example of S1AP is defined in 3GPP TS 36.413—Evolved Universal Terrestrial Radio Access Network (E-UTRAN); S1 Application Protocol (S1AP), Release 12. S1AP messages may be protected using NDS/IP (Network Domain Security/Internet Protocol). NDS/IP utilizes IP Security (IPSec) to implement security domain services. For example, an IPSec tunnel may be used to protect the messages between the eNB and the HMME/SME.

Figure 12:
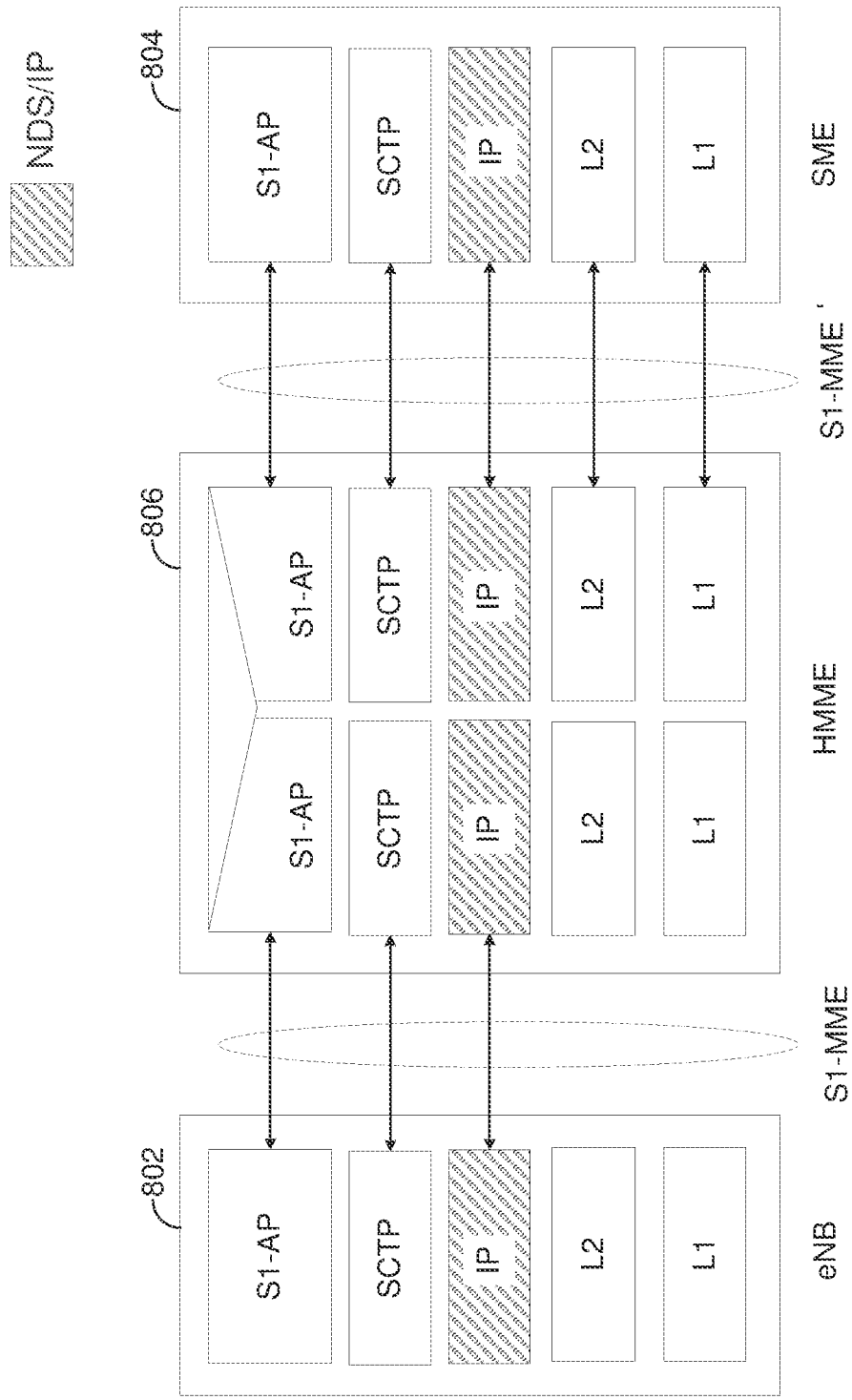
FIG. 12 is a diagram illustrating an example of S1AP (S1 Application Protocol) communication between an eNB and an SME using an HMME as a proxy.

In one aspect of the disclosure, the messages between an eNB and an HMME may use S1 AP as defined in the LTE standard (e.g., 3GPP TS 36.413). Referring to FIG. 12, the messages between an eNB 802 and an SME 804 may be communicated using the S1AP, and an HMME 806 may be implemented as a proxy between the eNB and SME. The eNB 802, SME 804, and HMME 806 may be the same as those described in FIGS. 4-8, 10, 11, and 14-18. In this example, the HMME 806 and SME 804 may use separate UE IDs. The HMME 806 translates an HMME UE ID to an SME UE ID or vice versa. An IPSec tunnel is created between the eNB 802 and HMME 806, and another IPSec tunnel is created between the HMME 806 and SME 804. The IPSec tunnels may be protected by NDS/IP. However, the present disclosure is not limited to S1AP for the communication between the eNB and HMME/SME. In some aspects of the disclosure, a separate communication protocol may be used between the eNB and SME, between the HMME and SME, between the eNB and HMME, or a combination thereof.

Figure 13:
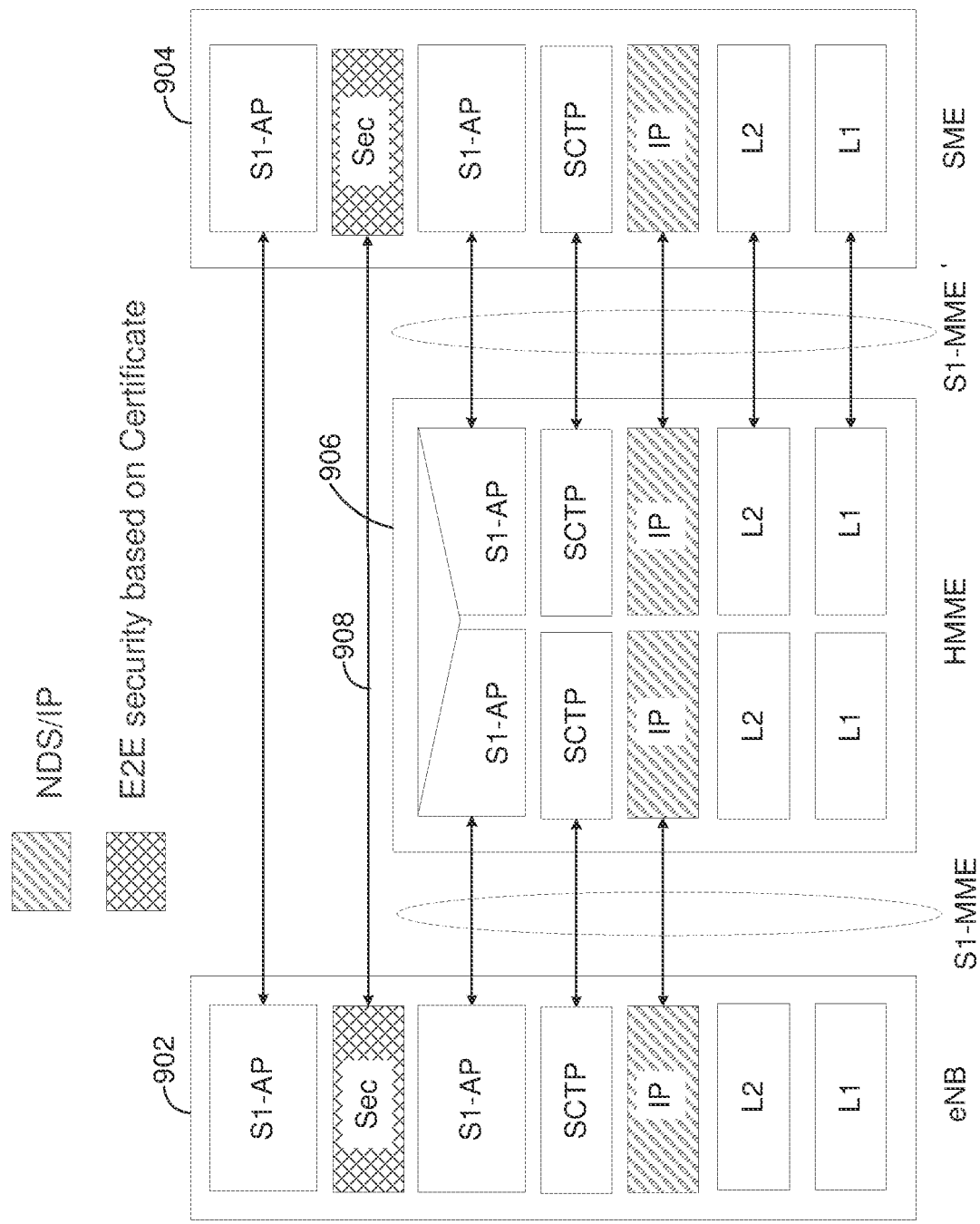
FIG. 13 is a diagram illustrating an example of S1AP communication between an eNB and an SME using a secure tunnel through an HMME.

Referring to FIG. 13, the S1AP between an eNB 902 and an SME 904 may be implemented by tunneling through an HMME 906. The eNB 902, SME 904, and HMME 906 may be the same as those described in FIGS. 4-8, 10, 11, and 14-18. In this example, during registration or service request, the HMME 906 provides an eNB ID and address to the SME 904. Then the eNB 902 and SME 904 may establish a secure channel 908 based on a pre-installed credential (e.g., certificate). In one particular example, the secure channel 908 may be based on an IPSec tunnel, TLS (Transport Layer Security), or DTLS (Datagram Transport Layer Security). In this case, the S1AP messages between the eNB 902 and SME 904 tunnel through the HMME 906 using a transparent container.

Figure 14:
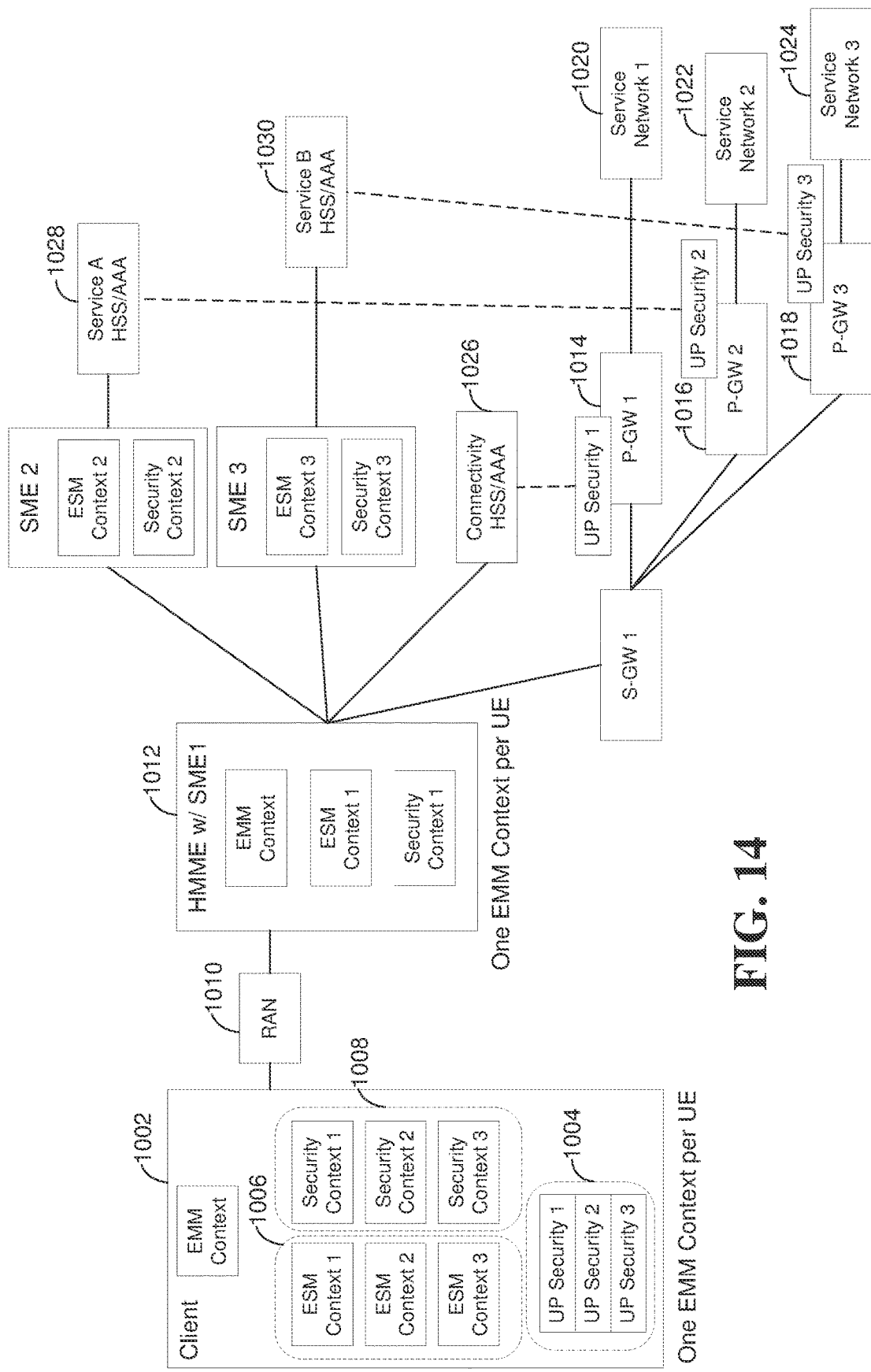
FIG. 14 is a diagram illustrating an example of an HMME control plane model with extended user-plane security in accordance with an aspect of the disclosure.

In addition to the control plane security described in reference to FIGS. 4-6, additional security may be implemented at the user plane to secure the communication between a client device and an SME. FIG. 14 is a drawing illustrating an HMME control plane model with extended user-plane security in accordance with one aspect of the disclosure. The extended user-plane security may be implemented in all three HMME control plane models shown in FIGS. 4-6, or in other suitable HMME control plane models. For example, a client device 1002 (e.g., UE) may utilize a number of user plane (UP) security contexts 1004 to perform additional authentication with a number of packet data gateways (P-GWs). The UP security contexts 1004 allow a service provider to provide an extra layer of security to the messages or communication between the client device 1002 and the service providers' networks, in addition to those provided by the ESM contexts 1006 and security contexts 1008. Furthermore, UP security may be controlled and maintained by the service providers such that information and content of the messages or communication can be shielded from the connectivity provider's network, for example, an RAN 1010 and an HMME.

In one aspect of the disclosure, a first P-GW 1014, a second P-GW 1016, and a third P-GW 1018 provide connections to a first service network 1020, a second service network 1022, and a third service network 1024, respectively. The first P-GW 1014 may check whether the client device 1002 has a valid subscription or credential for service by performing an authentication procedure with a first HSS/AAA 1026 based on a corresponding UP security context (e.g., UP security 1). The second P-GW 1016 may check whether the client device 1002 has a valid subscription or credential for service by performing an authentication procedure with a second HSS/AAA 1028 based on a corresponding UP security context (e.g., UP security 2). Similarly, the third P-GW 1018 may check whether the client device 1002 has a valid subscription or credential for service by performing an authentication procedure with a third HSS/AAA 1030 based on a corresponding UP security context (e.g., UP security 3).

Figure 15:
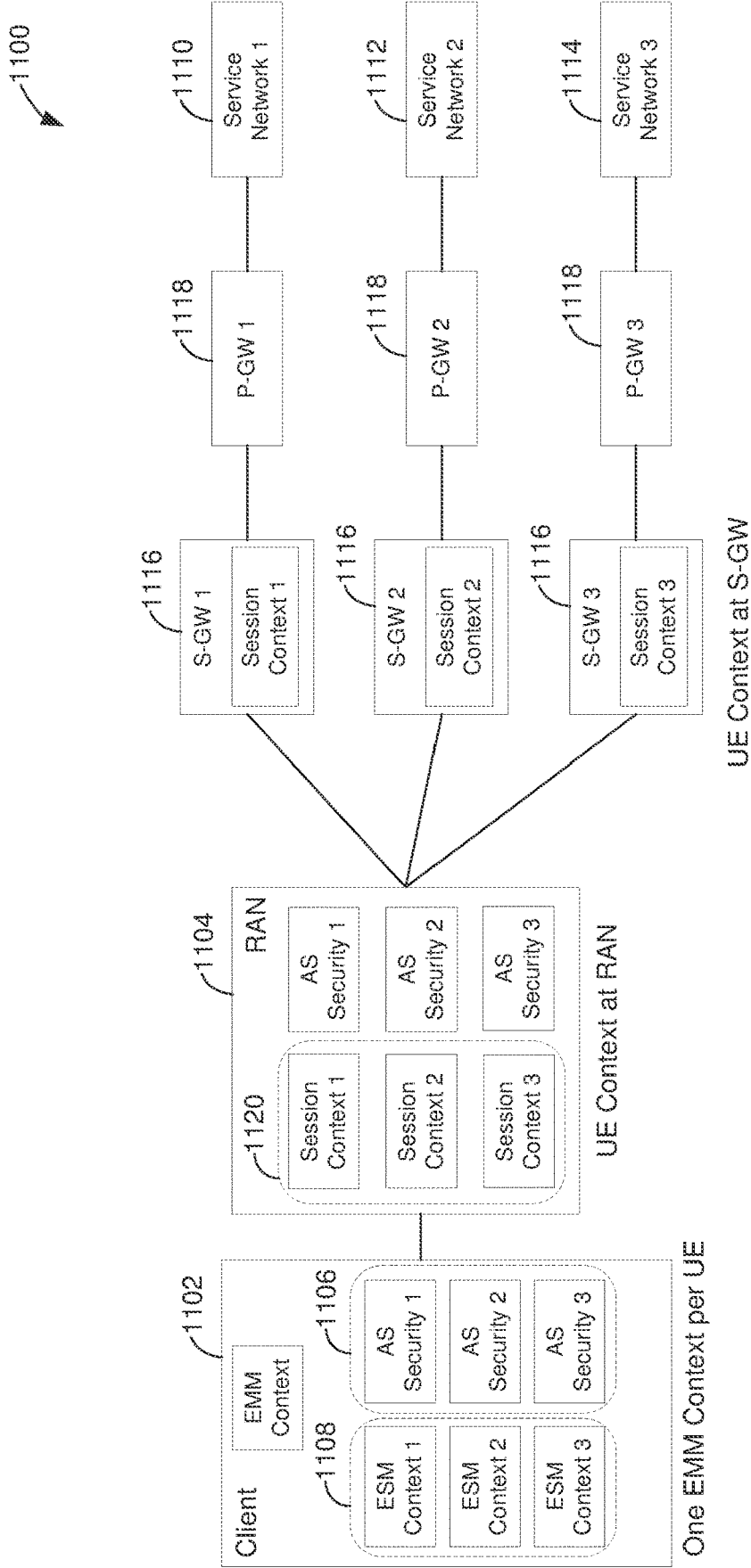
FIG. 15 is a diagram illustrating a first example of an HMME data plane model in accordance with an aspect of the disclosure.
Figure 16:
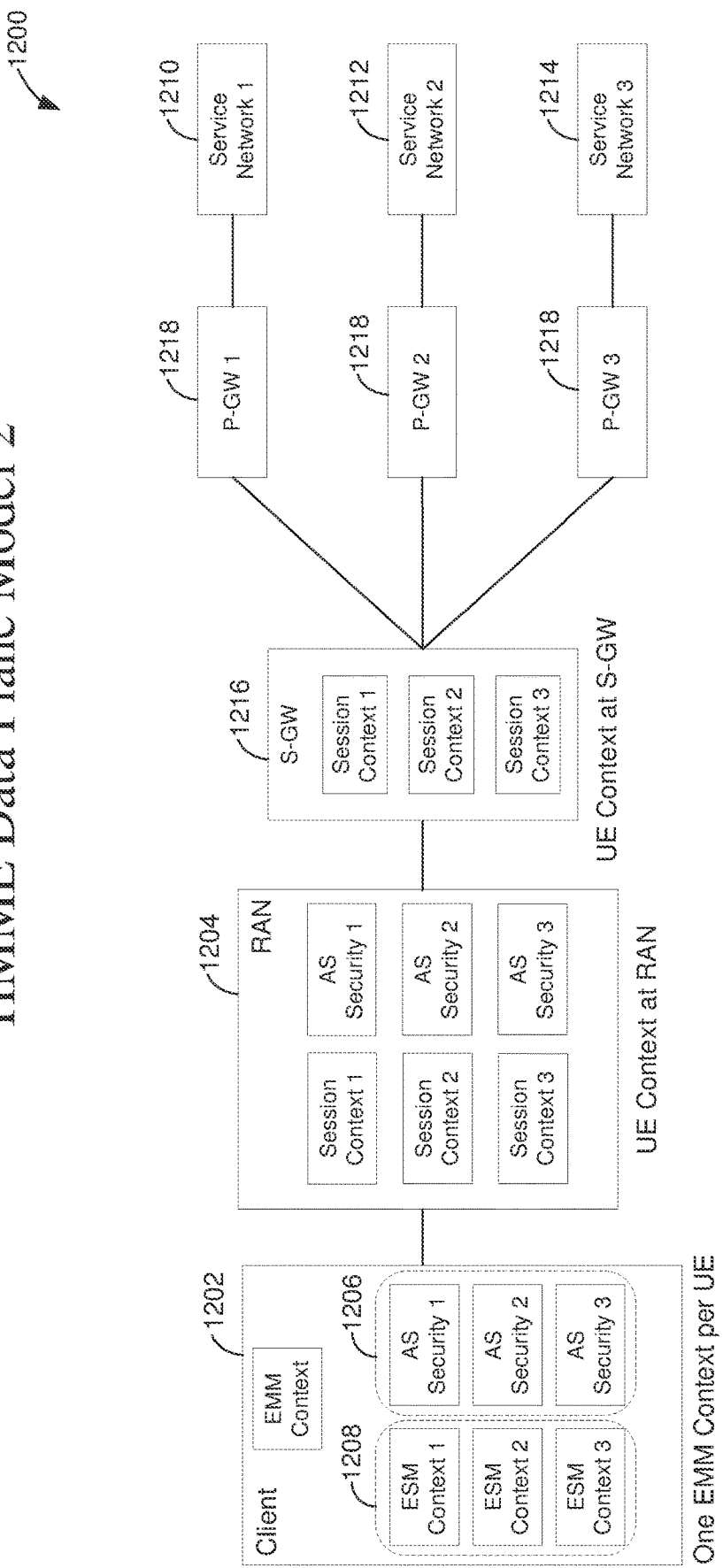
FIG. 16 is a diagram illustrating a second example of an HMME data plane model in accordance with an aspect of the disclosure.
Figure 17:
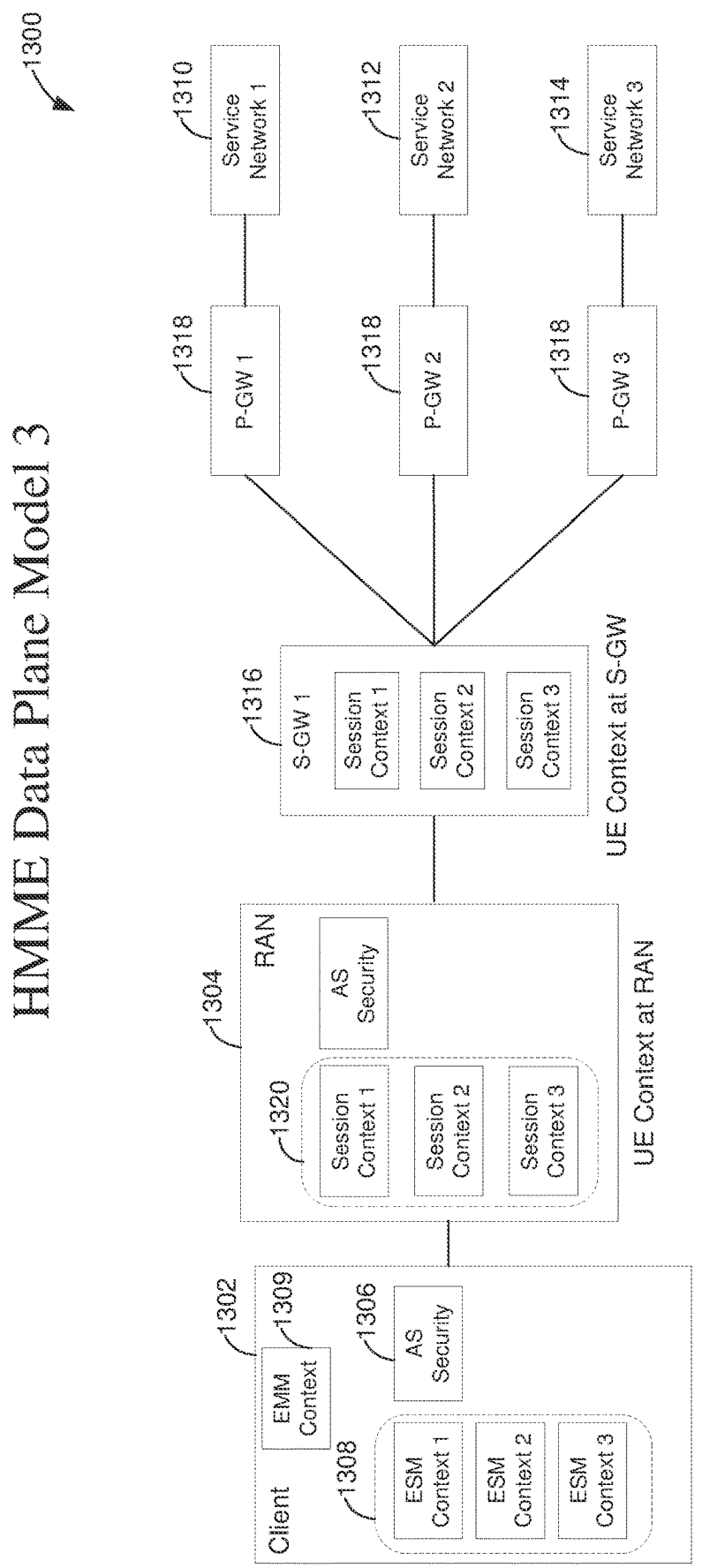
FIG. 17 is a diagram illustrating a third example of an HMME data plane model in accordance with an aspect of the disclosure.

FIGS. 15-17 are drawings illustrating some exemplary HMME user plane models utilizing access stratum security contexts in accordance with some aspects of the disclosure. In these examples, one EMM context is used per client device to establish a single network connection or link with an access network (RAN), while multiple ESM contexts and access stratum (AS) security contexts are used for establishing service connections with different service providers (service networks). The EMM context and ESM contexts may be established using the procedures as described in relation to FIGS. 7-11 above. The AS security contexts may be used to secure and protect the user plane communication between a client device and an RAN. These HMME data plane models may be implemented together with the HMME control plane models described in FIGS. 4-6 above or other suitable control plane models.

FIG. 15 illustrates a first HMME data plane model 1100 that may be implemented with the HMME control plane models shown in FIGS. 4 and 5 or other suitable HMME control plane models. In the example shown in FIG. 15, for UE-to-RAN data plane traffic between a client device 1102 and an RAN 1104, the client device 1102 (e.g., UE) determines an AS security context 1106 from an ESM context 1108 that corresponds to a message destined to a certain service network. In this example, three AS security contexts 1106 are derived from three ESM contexts 1108. The client device 1102 has established a first ESM context (ESM context 1) with a first service network 1110, a second ESM context (ESM context 2) with a second service network 1112, and a third ESM context (ESM context 3) with a third service network 1114. The first HMME data plane model 1100 uses separate S-GWs 1116 for different P-GWs 1118.

For a control message (e.g., an RRC message), the client device 1102 may encrypt and integrity-protect the message and add a VESM tag to the message, based on the AS security context. For a data message, the client 1102 may encrypt the data message and add a VESM tag to the message, based on the AS security context.

For RAN-to-UE data plane traffic, the RAN node 1104 (e.g., eNB) determines an AS security context for a message to be sent to the UE or client device 1102. In one example, for a control message (e.g., an RRC message), a default AS security context derived from an ESM security context of an HMME (not shown in FIG. 15) may be used. At the RAN 1104 (e.g., eNB), the session contexts 1120 (e.g., session contexts 1, 2, 3) provide the information used to forward the packets from the client 1102 (e.g., UE) to the S-GWs 1116 or vice versa. For example, a session context may include bearer IDs, QoS information, tunnel endpoint IDs, and so on. The session contexts at the S-GWs 1116 are similar to those of the RAN 1104. For example, these contexts may provide the information used for forwarding packets for a client 1102 received from the P-GWs 1118 to the RAN 1104 (e.g., eNB) and vice versa.

For a control message, (e.g., an RRC message), the RAN node 1104 may encrypt and integrity-protect the message and add a VESM tag to the message, based on the AS security context. For a data message, the RAN node 1104 may encrypt the message and add a VESM tag to the message, based on the AS security context. In one example, a VESM tag may be determined from the TEID (unique tunnel endpoint identifier) and S-GW IP address. Upon receiving a message from the RAN node 1104, the client device 1102 may determine a corresponding AS security context to verify the message based on the VESM tag.

FIG. 16 illustrates a second HMME data plane model 1200 that may be implemented with the HMME control plane model shown in FIG. 6 or other suitable HMME control plane models. In the second HMME data plane model 1200, for UE-to-RAN data plane traffic between a client device 1202 and an RAN 1204, the client device 1202 (e.g., UE) determines an AS security context 1206 that corresponds to a message destined to a certain service network. In this example, three AS security contexts 1206 are derived from ESM contexts 1208. The client device 1202 has established a first ESM context (ESM context 1) with a first service network 1210, a second ESM context (ESM context 2) with a second service network 1212, and a third ESM context (ESM context 3) with a third service network 1214. The second HMME data plane model 1200 uses a common S-GW 1216 for different P-GWs 1218. The second HMME data plane model 1200 is similar to the first HMME data plane model 1100, and redundant description of the second HMME data plane model 1200 will not be repeated for brevity.

FIG. 17 illustrates a third HMME data plane model 1300 that may be implemented with the HMME control plane model shown in FIG. 6 or other suitable HMME control plane models. A client device 1302 may have established different ESM contexts 1308, for example, a first ESM context, a second ESM context, and a third ESM context for a first service network 1310, a second service network 1312, and a third service network 1314, respectively. In this particular example, for UE-to-RAN data plane traffic, a client device 1302 (e.g., UE) may use a default AS security context 1306 derived from an EMM security context 1309. In another example, an AS security context derived from an ESM security context 1308 may be set as the default AS security context. For a control message (e.g., an RRC message), the client device 1302 may encrypt and integrity-protect the control message and add a VESM tag to the control message based on the AS security context. For a data message, the client device 1302 may encrypt the data message and add a VESM tag to the message, based on the AS security context.

At the RAN 1304, the session contexts 1320 (e.g., session contexts 1, 2.3) provide the information used to forward the packets from the client 1302 (e.g., UE) to the S-GW 1316 or vice versa. For example, a session context may include bearer IDs, QoS information, tunnel endpoint IDs, and so on. The session contexts at the S-GW 1316 are similar to those of the RAN 1304. For example, these contexts may include the information about how to forward packets for a client 1302 received from the P-GWs 1318 to the RAN 1304 (e.g., eNB) and vice versa.

In the above described data plane models, at the RAN, a UE context includes information about a client (e.g., UE), for example including a session context, an AS security context, and other states related to the client. Similarly, at the HMME, a UE context includes information about the client including EMM/ESM contexts, security context, and other states, e.g., IMSI, TMSI, and so on.

For RAN-to-UE data plane traffic, the RAN node 1304 (e.g., eNB) may use a default AS security context provisioned by the HMME (not shown in FIG. 17). For a control message (e.g., an RRC message), the RAN node 1304 (e.g., eNB) may encrypt and integrity-protect the message and add a VESM tag to the message, based on the AS security. For a data message, the RAN node 1304 may encrypt the message and add a VESM tag to the message, based on the AS security context. For example, the VESM tag may be determined from the TEID and S-GW IP address.

Figure 18:
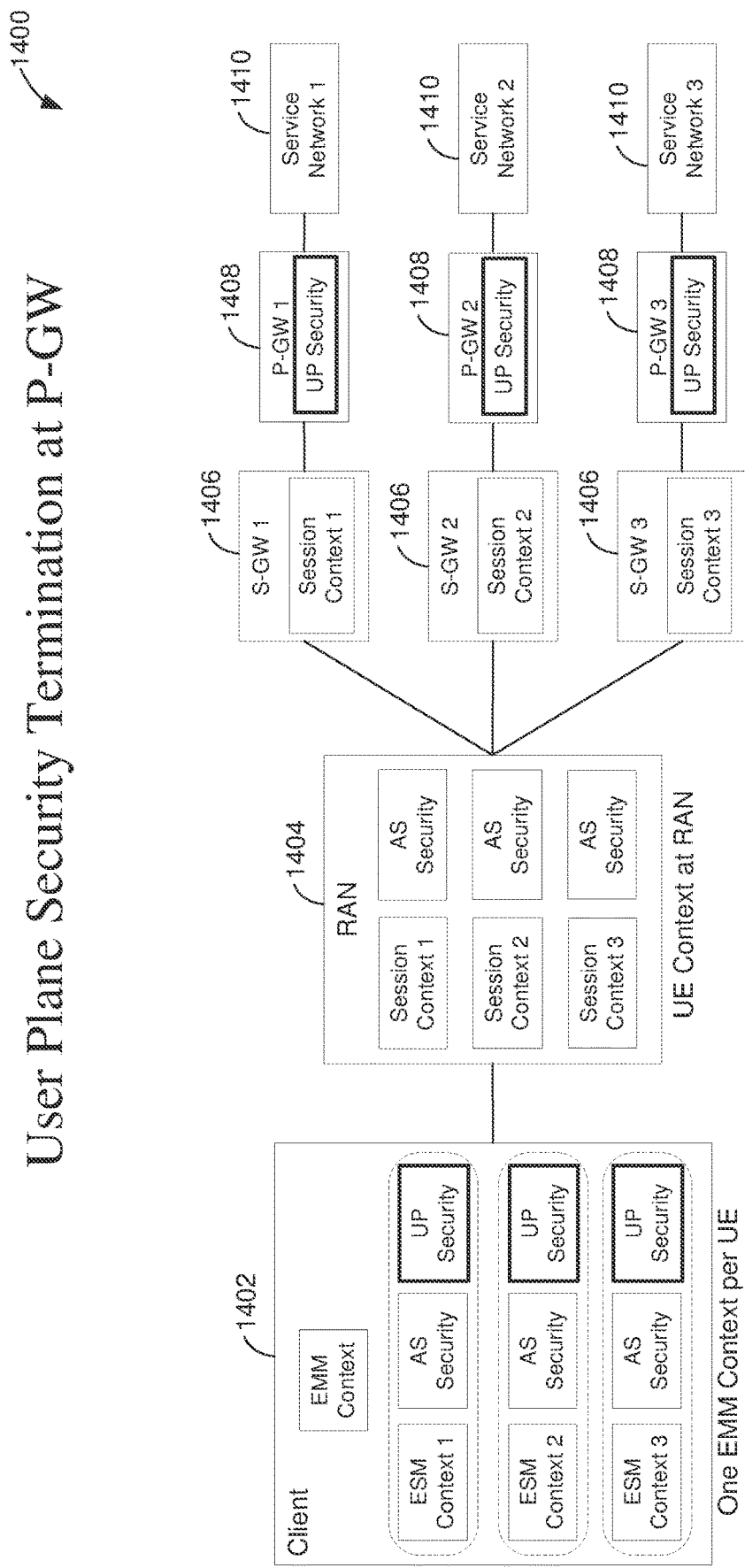
FIG. 18 is a diagram illustrating an example of user plane security termination in accordance with an aspect of the disclosure.

FIG. 18 is a drawing illustrating an exemplary user plane security termination model 1400 in accordance with an aspect of the disclosure. A client device 1402 similar to those described in FIGS. 15-17 has a single ESM context established with a RAN 1404. The RAN 1404 is connected to three S-GWs 1406, which are respectively connected to different packet data gateways (P-GWs) 1408. Each of the P-GWs 1408 provides access to a corresponding service network 1410. The EMM context and multiple ESM context may be established using the procedures described above in relation to FIGS. 7-11. In this example, user plane security (UP security) terminates at the packet data gateways 1408 (P-GW1, P-GW2, P-GW3). This user-plane security termination model may be used in the data plane models illustrated in FIGS. 15-17. UP security enables a service provider to protect user data traffic from an access network (e.g., RAN 1404). In various aspects of the disclosure, AS security context may be used to protect both a Data Radio Bearer (DRB) and a Signaling Radio Bearer (SRB) between the client device and the RAN, and UP security is applied separately from DRB protection.

Figure 19:
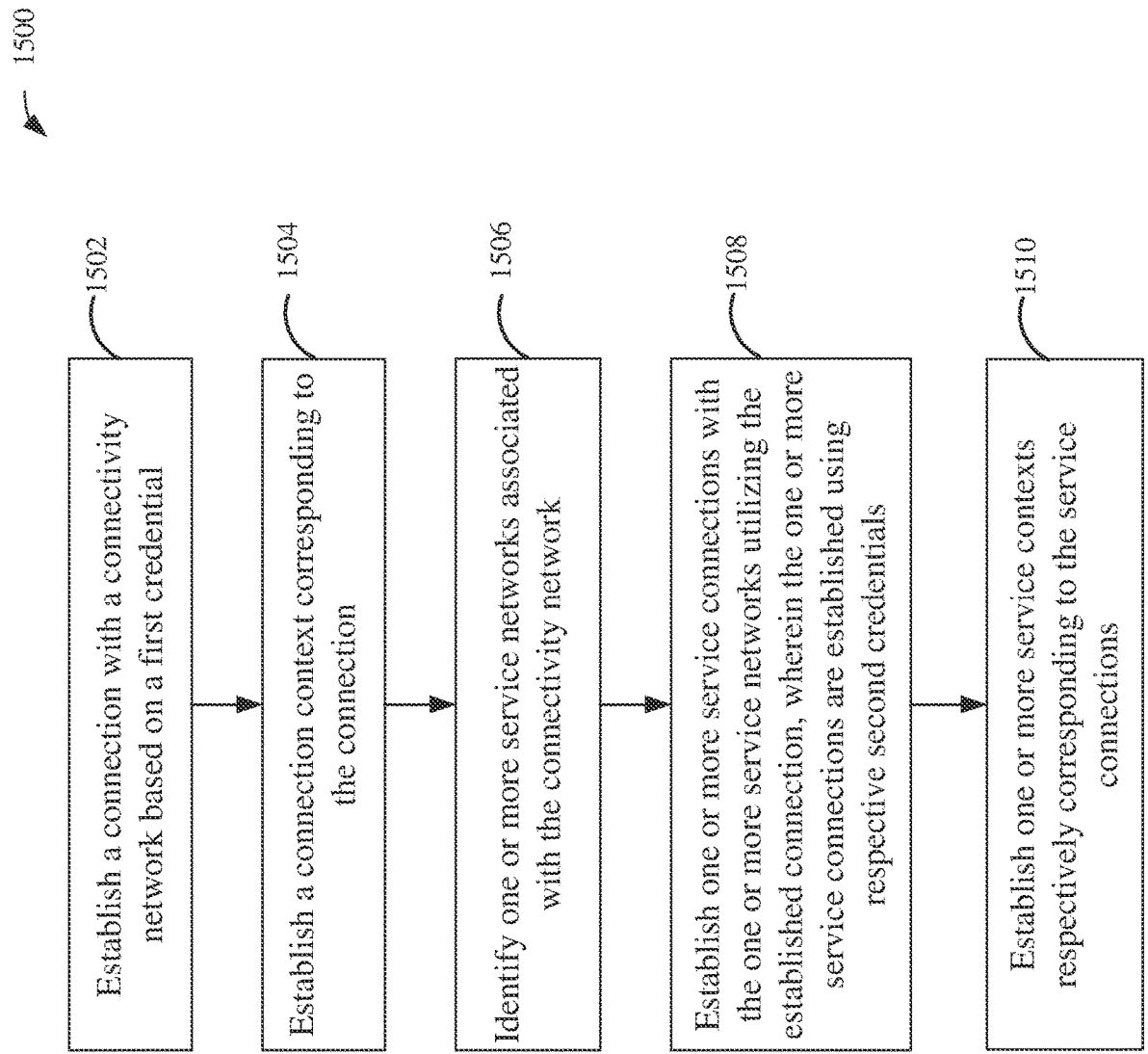
FIGS. 19 and 20 are a flow chart illustrating an exemplary method operable at a client device to establish multiple service contexts utilizing a single connectivity, in accordance with an aspect of the disclosure.

FIG. 19 is a flow chart illustrating an exemplary method 1500 operable at a client device to establish multiple simultaneous or concurrent service contexts in accordance with an aspect of the disclosure. The method 1500 may be performed at a client device illustrated in any of FIGS. 1, 2, 4-8, 10, 11, and/or 14-18. At block 1502, the client device establishes a wireless link or connection with a connectivity network based on a first credential. At block 1504, the client device establishes a connection context corresponding to the connection. For example, a client device (UE) may attach to an access network (e.g., RAN) using a connectivity credential and establish a single connection to the RAN utilizing an HMME (e.g., HMMEs of FIGS. 4-6). In some examples, the HMME may reside in a core network. At this point, a single EMM context or connectivity is established. In one example, the client device may utilize a radio link establishment module 210 and a wireless network communication interface 204 (see FIG. 2) to establish the wireless link and connectivity context.

At block 1506, the client device identifies one or more service networks associated with the connectivity network. For example, the client device may transmit a first message destined to the one or more service networks, and wherein the first message is encapsulated in a second message destined to a network node (e.g., HMME) of the access network. A message is destined to a certain network when the message is addressed to a specific entity (e.g., an HMME or SME of a service network) of the destined network. For example, the service networks may be the service networks illustrated in FIGS. 4-6 and 14-17. The client device may utilize a service context establishment module 212 (see FIG. 2) to perform the procedures similar to those illustrated in FIGS. 7, 8, 10, and 11 to identify the service networks.

At block 1508, the client device establishes one or more service connections with the service networks utilizing the established wireless link or connection, wherein the one or more service connections are established using respective second credentials. At block 1510, the client device establishes one or more service contexts respectively corresponding to the service connections. The service contexts may include different security contexts. Each of the security contexts includes an NAS security context and an AS security context, and both NAS and AS security contexts correspond to a same second credential. For example, the service contexts may be the ESM contexts described in FIGS. 4-6 and 14-17, and the security contexts may be those described in FIGS. 4-6 and 14-17. The client device may utilize the service context establishment module 212 to perform the procedures similar to those illustrated in FIGS. 7, 8, 10, and 11 to establish the service connections and contexts. Each of the service connections may be protected with a separate key based on the corresponding AS security context and distinguished by a corresponding VESM tag.

Figure 20:
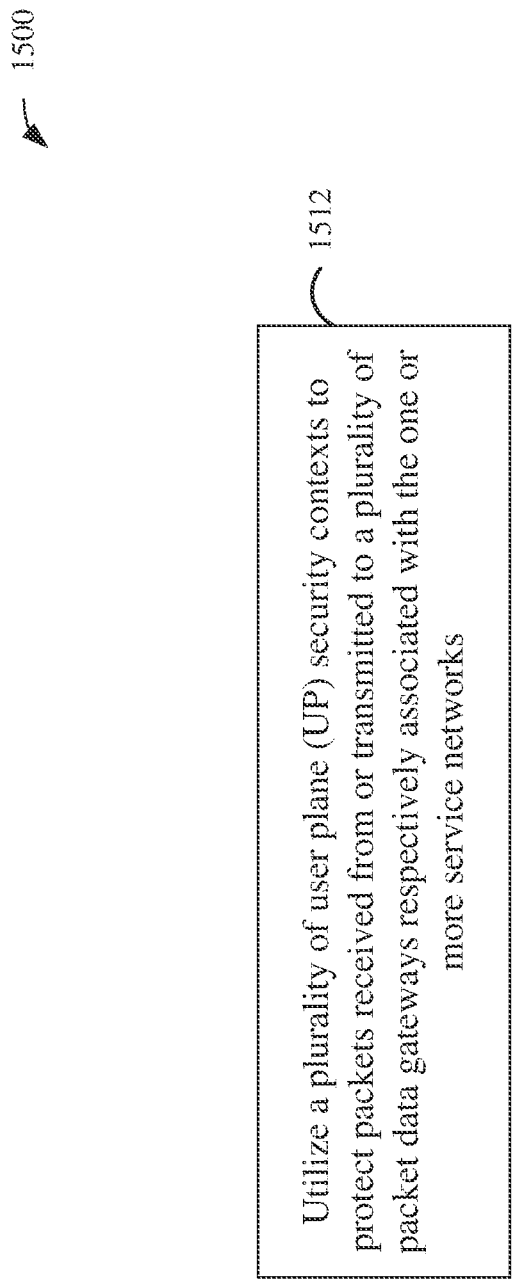

FIG. 20 is a flow chart illustrating additional procedures of the method 1500 in accordance with an aspect of the disclosure. At block 1512, the client device may utilize a plurality of user plane (UP) security contexts to protect packets received from or transmitted to a plurality of packet data gateways (P-GWs) respectively associated with the one or more service networks. For examples, the P-GWs may be the P-GWs illustrated in any of FIGS. 4-8, 10, 11, and 14-18.

Figure 21:
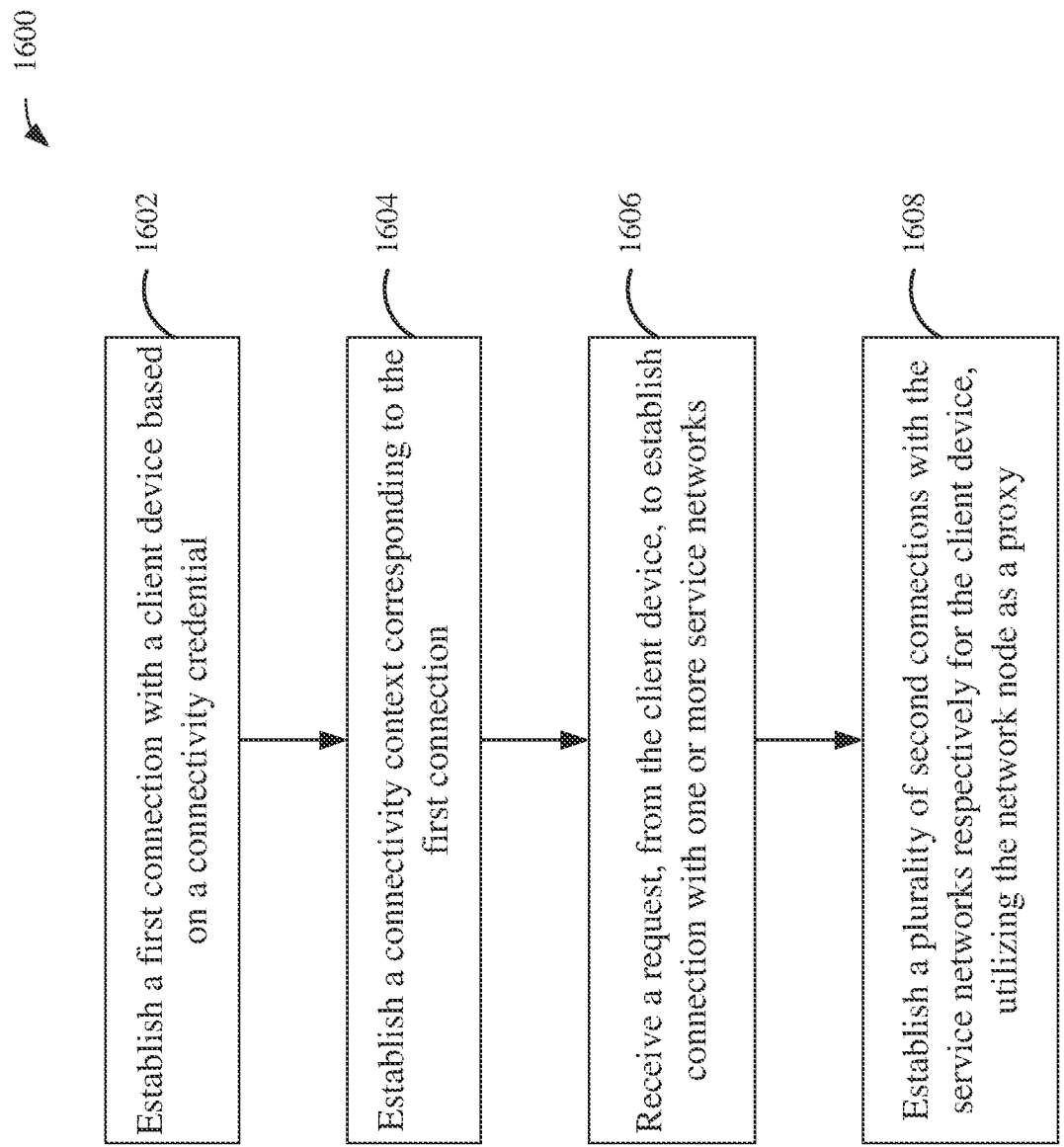
FIGS. 21 and 22 are a flow chart illustrating an exemplary method operable at a network node of a connectivity network to establish a single connection with a client for supporting multiple service networks, in accordance with an aspect of the disclosure.

FIG. 21 is a flow chart illustrating an exemplary method 1600 operable at a network node of a connectivity network in accordance with an aspect of the disclosure. The method 1600 may be performed at a network node (e.g., HMME) illustrated in any of FIGS. 1, 3, 4-8, and 10-18. At block 1602, a network node of a connectivity network establishes a wireless link or first connection with a client device based on a connectivity credential. At block 1604, the network node establishes a connectivity context corresponding to the first connection. For example, the network node may be an HMME (e.g., HMMEs shown in FIGS. 4-14) that receives a first attach request from a client device (UE) to establish a single connection and the corresponding EMM context with the client device using a connectivity credential. The network node may utilize a radio link establishment module 310 and a network communication interface 304 and a HMME module 312 to establish a single link and the EMM context with the client device (see FIG. 3) using the procedures described in FIGS. 7-11.

After a single wireless link has been established with the client device, at block 1606, the network node may receive a request, from the client device, to establish connections with one or more service networks associated with the connectivity network. For example, the service networks may the service networks or providers illustrated in FIGS. 4-6 and 14-18. The request may include a second attach request to establish separate ESM contexts with one or more of the service networks or providers using the existing wireless link or connectivity. Each of the ESM contexts may correspond to a different security context. The network node may utilize the network communication interface 304 (see FIG. 3) to receive the request from the client device.

At block 1608, the network node establishes one or more second connections with the service networks respectively for the client device, utilizing the network node as a proxy. In one example, the network node may utilize an SME module 314 to establish the second connections and the corresponding contexts using the procedures described in FIGS. 7-11.

Figure 22:
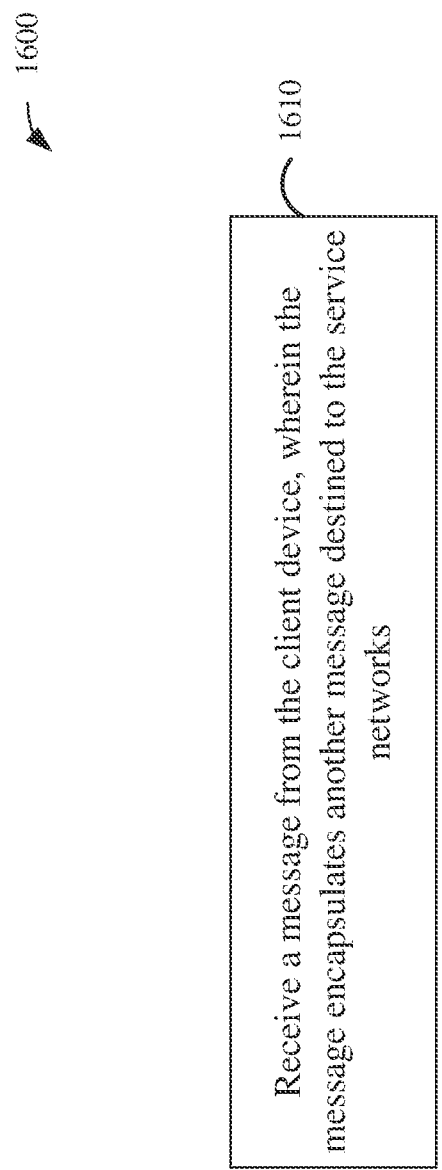

FIG. 22 is a flow chart illustrating additional procedures of the method 1600 in accordance with an aspect of the disclosure. At block 1610, the network node may receive a message from the client device, wherein the message encapsulates another message destined to the service networks. For example, the message may be NAS encapsulated messages illustrated in FIGS. 8 and 11.

Figure 23:
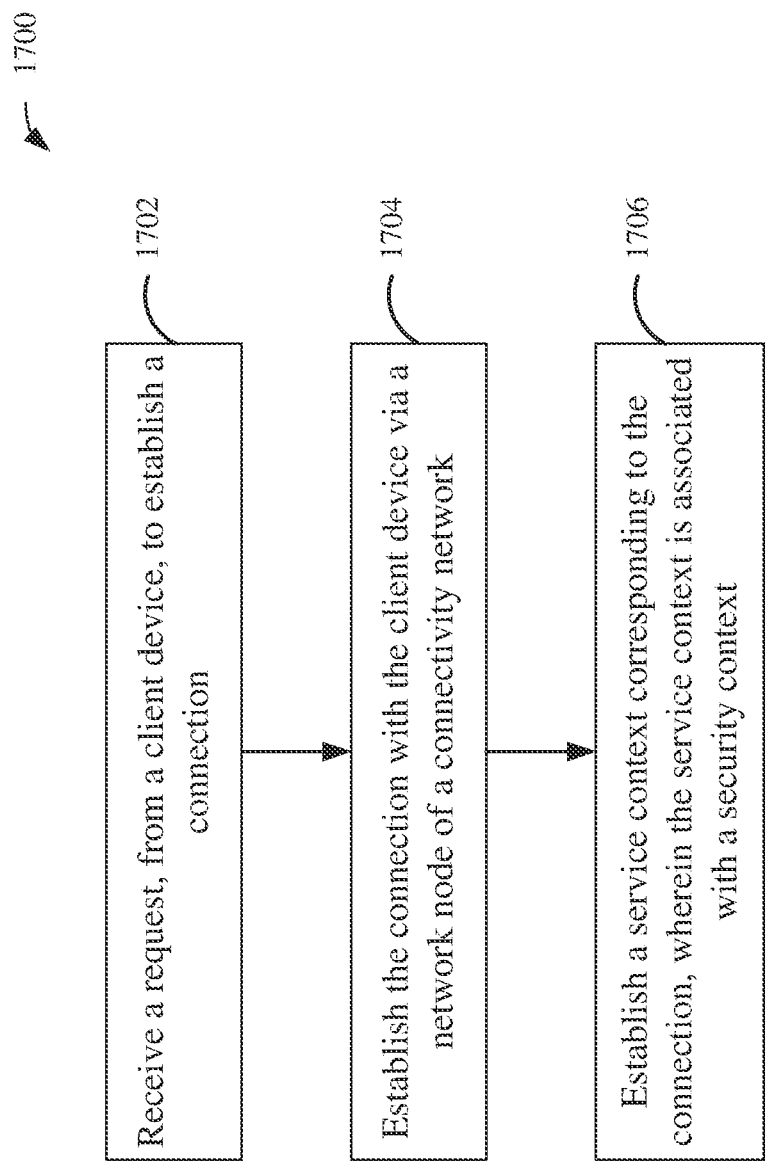
FIG. 23 is a flow chart illustrating an exemplary method operable at a network node of a service network to establish multiple security contexts with a client device using a single connection with a connectivity network, in accordance with an aspect of the disclosure.

FIG. 23 is a flow chart illustrating an exemplary method 1700 operable at a network node of a service network in accordance with an aspect of the disclosure. The method 1700 may be performed at a network node (e.g., SME) illustrated in any of FIGS. 1, 3, 4-8, and 10-18. At block 1702, the network node receives a request, from a client device, to establish a connection. For example, an SME may utilize its network communication interface 304 (see FIG. 3) to receive the request. At block 1704, the network node establishes the connection with the client device via a network node (e.g., HMME) of a connectivity network. For the example, the network node may utilize a service management entity module/circuit/function 314 to establish the connection. At block 1706, the network node establishes a service context corresponding to the connection, wherein the service context is associated with a security context. For example, the service management entity module/circuit/function 314 may be configured by the SME instructions 318 to establish a service context 334 (see FIG. 3).

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of operating a client device, comprising:
    establishing a connectivity context with a connectivity network; and
    establishing a plurality of service contexts with a plurality of respective service networks utilizing the connectivity context established with the connectivity network, wherein the plurality of service contexts are established using a corresponding plurality of credentials provided by the client device;
    wherein each service context of the plurality of service contexts respectively comprises a different security context, and
    wherein the respective security context of each of the plurality of service contexts comprises a core network security, context and an access security context using a same respective credential of the plurality of credentials.

2. The method of claim 1,
    wherein the core network security context is configured to protect control messages between the client device and at least one of a host mobility management entity (HMME) or a Service Management Entity (SME), and
    wherein the access security context is configured to protect at least one of: one or more signaling radio bearers, one or more data radio bearers, or a combination of signaling radio bearers and data radio hearers.

3. The method of claim 1, wherein the establishing the plurality of service contexts comprises transmitting a message destined to the plurality of service networks, wherein the message is encapsulated in a message destined to a host mobility management entity (HMME) of the connectivity network.

4. The method of claim 1, wherein the plurality of service networks comprise a virtual network that is at least partially established in the connectivity network, and the plurality of service networks are respectively associated with different services.

5. The method of claim 1, wherein each of the plurality of service contexts is protected with a separate key based on the corresponding access security context and distinguished by a corresponding virtual Evolved Packet System (EPS) Session Management tag.

6. The method of claim 1, further comprising:
    utilizing a plurality of user plane (UP) security contexts to protect packets received from or transmitted to a plurality of packet data gateways respectively associated with the plurality of service networks.

7. The method of claim 6, wherein the protecting the packets comprises at least one of:
    encrypting the packets;
    integrity protecting the packets; or
    encrypting and integrity protecting the packets.

8. A method of operating a network node of a connectivity network, comprising:
    establishing a first connectivity context with a client device
    receiving a request, from the client device, to establish a plurality of service contexts with a plurality of respective service networks; and
    establishing the plurality of service contexts with the plurality of service networks respectively for the client device using a corresponding plurality of service credentials provided by the client device, utilizing the network node as a proxy, wherein the network node comprises a host mobility management entity (HMME),
    wherein each service context of the plurality of service contexts respectively comprises a different security context, and
    wherein the respective security context of each of the plurality of service contexts comprises a core network security context and an access security context, with both the core network security context and the access security context using a same respective service credential of the plurality of service credentials.

9. The method of claim 8, wherein each of the plurality of service contexts comprises IP Security (IPSec) tunnels.

10. The method of claim 8, further comprising receiving a message from the client device, wherein the message encapsulates another message destined to the plurality of service networks.

11. A method of operating a network node of a service network, comprising:
    receiving a request, from a client device, to establish a connectivity context;
    establishing the connectivity context with the client device via a network node of a connectivity network, wherein the network node of the connectivity network comprises a host mobility management entity (HMME); and
    establishing a plurality of service contexts with a corresponding plurality of service networks based on a corresponding plurality of service credentials provided by the client device, wherein each service context of the plurality of service contexts is associated with a different security context,
    wherein the respective security context of each of the plurality of service contexts comprises a core network security context and an access security context, with both the core network security context and the access security context using a same respective service credential of the plurality of service credentials.

12. The method of claim 11, wherein at least one of the plurality of service contexts comprises an IP Security (IPSec) tunnel via the network node of the connectivity network.

13. The method of claim 11, wherein at least one of the plurality of service contexts comprises a virtual network that is at least partially established in the connectivity network.

14. The method of claim 11, wherein at least one of the plurality of service contexts is associated with a virtual Evolved Packet System (EPS) Session Management tag.

* * * * *